(12) United States Patent
Poler et al.

(10) Patent No.: US 11,542,181 B2
(45) Date of Patent: Jan. 3, 2023

(54) NANOMATERIALS, DEVICES, AND METHODS OF WATER TREATMENT

(71) Applicant: UNIVERSITY OF NORTH CAROLINA AT CHARLOTTE, Charlotte, NC (US)

(72) Inventors: Jordan Poler, Charlotte, NC (US); James E. Amburgey, Kannapolis, NC (US); Billy R. Johnson, Claremont, NC (US); Amir Y. Alansari, Charlotte, NC (US); Timothy Eldred, Williamston, MI (US)

(73) Assignee: UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 0 days.

(21) Appl. No.: 15/779,990

(22) PCT Filed: Nov. 30, 2016

(86) PCT No.: PCT/US2016/064203
§ 371 (c)(1),
(2) Date: May 30, 2018

(87) PCT Pub. No.: WO2017/095914
PCT Pub. Date: Jun. 8, 2017

(65) Prior Publication Data
US 2018/0354815 A1 Dec. 13, 2018

Related U.S. Application Data

(60) Provisional application No. 62/329,772, filed on Apr. 29, 2016, provisional application No. 62/260,948, (Continued)

(51) Int. Cl.
*C02F 1/42* (2006.01)
*B01D 15/36* (2006.01)
(Continued)

(52) U.S. Cl.
CPC .............. *C02F 1/42* (2013.01); *B01D 15/362* (2013.01); *B01D 15/363* (2013.01); *B01D 63/06* (2013.01);
(Continued)

(58) Field of Classification Search
None
See application file for complete search history.

(56) References Cited

U.S. PATENT DOCUMENTS 6,416,668 B1 * 7/2002 Al-Samadi ............. B01D 61/04
210/636
2004/0202603 A1 * 10/2004 Fischer ................ B01J 20/3251
423/447.2
(Continued)

FOREIGN PATENT DOCUMENTS

RU 2112747 C1 * 6/1998
RU 2112747 C1 6/1998

OTHER PUBLICATIONS

Machine translation of Abstract of RU2112747C1 (Year: 1998).*
(Continued)

*Primary Examiner* — Clare M Perrin
(74) *Attorney, Agent, or Firm* — J. Clinton Wimbish; Nexsen Pruet, PLLC

(57) ABSTRACT

In one aspect, separation media are described herein operable for removing one or more water contaminants including NOM and derivatives thereof. Briefly, a separation medium includes a nanoparticle support and an oligomeric stationary phase forming a film on individual nanoparticles of the support, the film having thickness of 1 to 100 nm. In some embodiments, oligomeric chains of the stationary phase are covalently bonded to the individual nanoparticles.

32 Claims, 13 Drawing Sheets

Related U.S. Application Data filed on Nov. 30, 2015, provisional application No. 62/260,961, filed on Nov. 30, 2015.

(51) Int. Cl.

| | |
|---|---|
| *B01D 63/06* | (2006.01) |
| *B01D 65/02* | (2006.01) |
| *B01J 39/04* | (2017.01) |
| *B01J 39/19* | (2017.01) |
| *B01J 39/26* | (2006.01) |
| *B01J 41/04* | (2017.01) |
| *B01J 41/12* | (2017.01) |
| *B01J 41/13* | (2017.01) |
| *B01J 47/127* | (2017.01) |
| *C02F 1/44* | (2006.01) |
| *C02F 101/10* | (2006.01) |
| *C02F 101/20* | (2006.01) |
| *C02F 101/30* | (2006.01) |

(52) U.S. Cl.
CPC .............. *B01D 65/02* (2013.01); *B01J 39/04* (2013.01); *B01J 39/19* (2017.01); *B01J 39/26* (2013.01); *B01J 41/04* (2013.01); *B01J 41/12* (2013.01); *B01J 41/13* (2017.01); *B01J 47/127* (2017.01); *C02F 1/44* (2013.01); *C02F 2001/422* (2013.01); *C02F 2001/425* (2013.01); *C02F 2101/10* (2013.01); *C02F 2101/20* (2013.01); *C02F 2101/30* (2013.01); *C02F 2303/16* (2013.01); *C02F 2305/08* (2013.01)

(56) References Cited

U.S. PATENT DOCUMENTS

| | | | |
|---|---|---|---|
| 2007/0141934 A1* | 6/2007 | Sayre | A61L 15/46 442/123 |
| 2010/0224555 A1* | 9/2010 | Hoek | B01D 67/0088 210/500.42 |
| 2011/0244003 A1 | 10/2011 | Kumaraswamy et al. | |
| 2013/0266509 A1* | 10/2013 | Pinol Lacambra | A61K 9/145 424/1.29 |
| 2014/0209539 A1* | 7/2014 | El Badawi | B01D 69/148 210/651 |
| 2014/0367326 A1 | 12/2014 | Deng et al. | |
| 2015/0259457 A1* | 9/2015 | Kaneshima | B01J 41/14 521/27 |

OTHER PUBLICATIONS

Dieckmann et al. (J. Am. Chem. Soc., 2003, 125, 1770-1777). (Year: 2003).*

"The Biology Project", pp. 1-2, 2003, accessed online on Apr. 16, 2021 at http://www.biology.arizona.edu/biochemistry/problem_sets/aa/Lysine.html (Year: 2003).*

Charcosset et al. (J. Chem. Technol. Biotechnol. 1998, 71, 95-110). (Year: 1998).*

Chen et al. (Biomaterials, 2014, 35, 4729-4738). (Year: 2014).*

Liu et al. (Langmuir, 2013, 29, 11354-11365). (Year: 2013).*

International Search Report and Written Opinion corresponding to PCT/US2016/064203, dated Feb. 16, 2017, 8 pages.

\* cited by examiner

Initiator:
Benzyl Bromide

Monomer:
VB-TMAC

Ligand/Metal Catalyst:
TPMA + Copper (I)

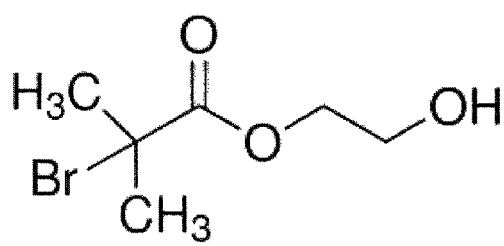
FIG. 3A
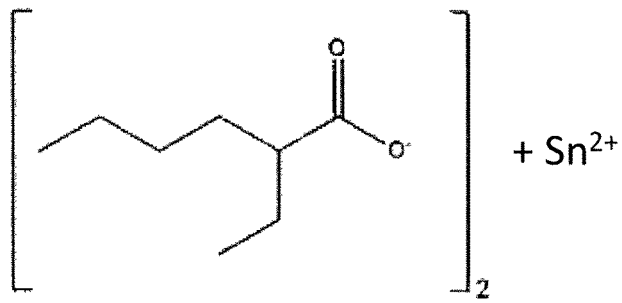
FIG. 3B
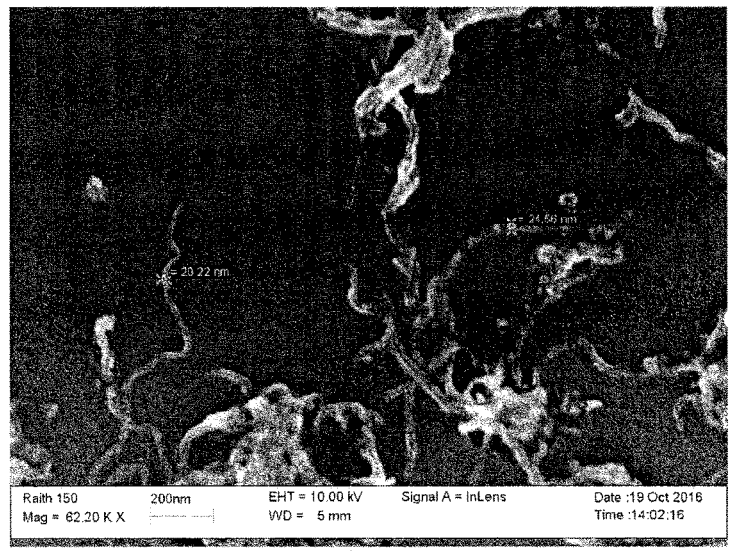
FIG. 4
| Sample | Diameter |
|---|---|
| Pristine SWCNT | 1-3 nm |
| Functionalized SWCNT | 9-13 nm |
| Sonicated Aq-SNR | 11-13 nm |
| Non-Sonicated Aq-SNR | 12-13 nm |
| Pristine MWCNT | 6-9 nm |
| Functionalized MWCNT | 20-25 nm |
FIG. 5

Initiation:

$$R-X + M_t^Z/L_n \underset{k_{deact}'}{\overset{k_{act}'}{\rightleftarrows}} R^{\bullet} + X-M_t^{Z+1}/L_n$$

$$\downarrow k_i \; +M$$

$$R-M-X + M_t^Z/L_n \rightleftarrows R-M^{\bullet} + X-M_t^{Z+1}/L_n$$

Propagation:

$$R-M_n-X + M_t^Z/L_n \underset{k_{deact}}{\overset{k_{act}}{\rightleftarrows}} R-M_n^{\bullet} + X-M_t^{Z+1}/L_n$$

$$(+M)\,k_p$$

Termination:

$$R-M_n^{\bullet} + R-M_m^{\bullet} \xrightarrow{k_t} R-M_n-M_m-R$$

FIG. 11

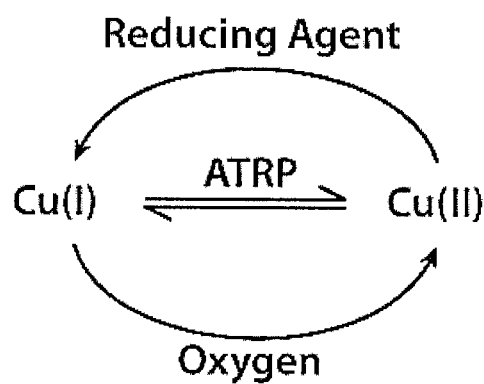

FIG. 12

INITIAL DOC (NaFL) = 6.70 mg-C/L

NANOMATERIALS, DEVICES, AND METHODS OF WATER TREATMENT

CROSS REFERENCE TO RELATED APPLICATIONS

This application is a U.S. National Phase of PCT/US2016/064203, filed Nov. 30, 2016, which claims priority pursuant to 35 U.S.C. § 119(e) to U.S. Provisional Patent Application Ser. No. 62/260,948, filed on Nov. 30, 2015, U.S. Provisional Patent Application Ser. No. 62/260,961, filed on Nov. 30, 2015, and U.S. Provisional Patent Application Ser. No. 62/329,772, filed on Apr. 29, 2016, each of which is hereby incorporated by reference in its entirety.

FIELD

This application relates to materials, devices, and methods of removing contaminants from a liquid and, more particularly, to nanomaterials for water treatment, and related devices and methods making and using the same.

BACKGROUND

Natural organic matter (NOM) is comprised of decomposed plant and animal residues, and exists in all active water resources. When NOM levels are too high (e.g., due to the natural or the continued rise of anthropogenic causes), they must be reduced via water treatment methods. NOM compounds, namely humic and fulvic acids are also sources of potential health hazards to humans and animals that will ingest treated water.

Modern water treatment methods utilize chlorine to destroy microbial pathogens. However, chlorine reacts with humic substances in NOM and forms disinfection byproducts (DBPs) that have deleterious human health risks. Moreover, the two most common regulatory problems stem from trihalomethanes (THMs) and haloacetic acids (HAAs), and subsequent interest has been placed on efficient removal of their precursors.

It is becoming increasingly difficult for water treatment facilities to mitigate the formation of DBPs at the limits set by the USEPA (i.e., 80 ppb for THM and 60 ppb for HAA). Prolonged exposure to DBPs can lead to kidney, liver, and central nervous system damage, as well as cancer. Better treatment technologies are needed to improve water quality and reduce the precursors which lead to the formation of carcinogenic DBPs in drinking water.

Removal of NOM is a primary concern for providing safer, cleaner water, and the extent of its removal depends on the efficiency of the treatment methods employed. Mismanagement of water treatment facilities and poor public policy, acutely punctuated by the events in Flint MI, exemplify a potential systemic risk to our society. Even with the practice of "enhanced coagulation" as prescribed by the USEPA, a source water with 2 mg/L of dissolved organic carbon (DOC) and a moderate alkalinity of 60-120 mg/L would only be required to remove 25% of the total organic carbon present in the water.

Many water treatment facilities rely solely on coagulation as the means of lowering levels of DOC; however, this is not an effective method of removing low molecular weight and hydrophilic varieties of NOM, as such smaller molecules are more readily removed via adsorption.

Some treatment facilities are looking into utilizing activated carbon to adsorb NOM, however; this method comes with a high operating cost. With increasing concentrations of NOM being observed in drinking water sources worldwide, there has been a significant increase in demand for more efficient removal.

Accordingly, a need exists for improved materials, devices, and methods of removing NOM and other contaminants from liquids, such as water, for providing safer drinking water having reduced levels of DBPs.

SUMMARY

In one aspect, separation media are described herein operable for removing one or more water contaminants, including NOM and derivatives thereof. Briefly, a separation medium comprises a nanoparticle support and an oligomeric stationary phase forming a film on individual nanoparticles of the support, the film having thickness of 1 to 100 nm. In some embodiments, oligomeric chains of the stationary phase are covalently bonded to the individual nanoparticles. Oligomeric chains of the stationary phase can comprise one or more moieties for anion exchange or cation exchange. Alternatively, charged moieties are absent from the oligomeric chains. In some embodiments, the oligomeric stationary phase is not cross-linked.

In another aspect, water treatment devices are described herein. A water treatment device comprises a membrane and a separation medium coupled to the membrane, the separation medium comprising a nanoparticle support and an oligomeric stationary phase forming a film on individual nanoparticles of the support, the film having thickness of 1 nm to 100 nm. In some embodiments, the membrane is hollow permitting coupling of the separation medium to interior and/or exterior membrane surfaces.

In a further aspect, methods of treating water are also described herein. A method of treating a water source comprises providing a water treatment device comprising a membrane and a separation medium coupled to the membrane, the separation medium comprising a nanoparticle support and an oligomeric stationary phase forming a film on individual nanoparticles of the support, the film having thickness of 1 nm to 100 nm. The separation medium is contacted with the water source and one or more contaminant species are removed from the water source by the separation medium. In some embodiments, contaminants removed from the water source include NOM and/or transition metals. Oligomeric chains of the stationary phase can comprise moieties for anion exchange or cation exchange. As discussed further herein, the separation medium, in some embodiments, establishes ion-exchange equilibrium with the water source in less than 20 minutes or less than 10 minutes.

These and other embodiments are described in more detail in the detailed description which follows.

BRIEF DESCRIPTION OF THE DRAWINGS

FIGS. 3A-3B illustrate the chemical structure of aqueous initiator and reducing agents used to synthesize nanomaterials according to some embodiments described herein.

FIG. 4 is a micrograph of functionalized carbon nanotubes (CNTs) forming nanomaterials according to some embodiments described herein.

FIG. 5 is a table depicting exemplary diameter data for functionalized CNTs that form nanomaterials according to some embodiments described herein.

FIG. 11 illustrates a stepwise reaction mechanism of Atom Transfer Radical Polymerization (ATRP) that forms nanomaterials according to some embodiments described herein.

FIG. 12 is a simplified schematic illustration of an Activators Re-Generated by Electron Transfer (ARGET) polymerization mechanism that forms nanomaterials according to some embodiments described herein.

DETAILED DESCRIPTION

Figure 1:
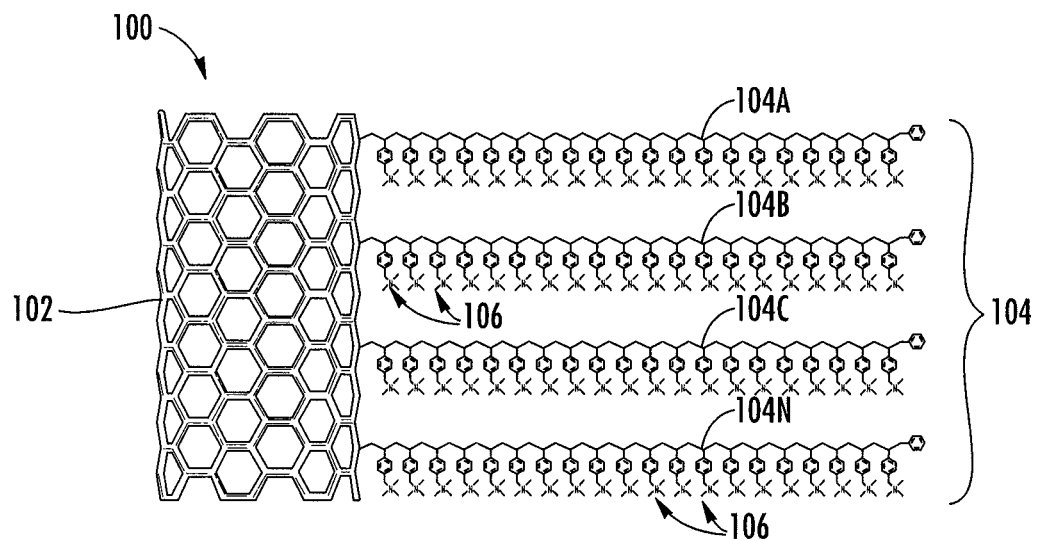
FIG. 1 is a schematic illustration of a nanomaterial according to one embodiment described herein.

Embodiments described herein can be understood more readily by reference to the following detailed description, examples, and figures (i.e., "FIGS."). Nanomaterials, devices, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the disclosed subject matter.

All ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

Further, all ranges disclosed herein are also to be considered to include the end points of the range, unless expressly stated otherwise. For example, a range of "between 5 and 10" or "5 to 10" or "5-10" should generally be considered to include the end points 5 and 10.

Additionally, in any disclosed embodiment, the terms "substantially," "approximately," and "about" may be substituted with "within [a percentage] of" what is specified, where the percentage includes 0.1, 1, 5, and 10 percent.

The terms "a" and "an" are defined as "one or more" unless this disclosure explicitly requires otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a composition or other object that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

It is further understood that the feature or features of one embodiment may generally be applied to other embodiments, even though not specifically described or illustrated in such other embodiments, unless expressly prohibited by this disclosure or the nature of the relevant embodiments. Likewise, materials, devices, and methods described herein can include any combination of features and/or steps described herein not inconsistent with the objectives of the present disclosure. Numerous modifications and/or adaptations of the materials, devices, and methods described herein will be readily apparent to those skilled in the art without departing from the present subject matter.

NOM is comprised of decomposed plant and animal residues, encompassing a variety of organic compounds, with a wide range of molecular weights. The majority of these compounds are weak electrolytes, lending themselves to ionic interactions with separation media. Unfortunately, anion exchange resins (AERs) are limited in their ability to remove positively charged or neutral NOM; conversely, styrenic polymer resins have demonstrated an increased ability to adsorb these types of NOM due to dispersive interactions with the styrene backbone. Commercially available ion exchange resins have been proven to be more effective than coagulation and activated carbon treatment methods. However, due to low specific surface area (SSA), accessible ion-exchange surface area is limited. While small molecules can effuse into the near-surface region of the material given sufficient time, high molecular weight NOM cannot. This slows the sorption kinetics and also lowers the overall capacity of the resin because these large molecules restrict transport of smaller molecules to the active adsorption sites. Moreover, intraparticle diffusion mechanisms further retard ion exchange equilibrium rates and separation efficiencies.

In view of these disadvantages, separation media are described herein employing nanoscale dimensions for high surface area and rapid exchange equilibrium rates. A separation medium comprises a nanoparticle support and an oligomeric stationary phase forming a film on individual nanoparticles of the support, the film having thickness of 1 to 100 nm. As discussed further herein, the high surface area provided by the nanoparticle support in conjunction with the thin film of oligomeric stationary phase significantly enhances equilibrium rates with liquids contacting the stationary phase. In some embodiments, for example, ion exchange equilibrium can be reached in less than 20 minutes or in less than 10 minutes when the oligomeric stationary phase is contacted with liquid containing NOM and/or other ionic contaminant. In some embodiments, the foregoing equilibrium times can be achieved with oligomeric or polymeric stationary phase forming a film on individual nanoparticles of the support having thickness greater than 100 nm, such as a stationary phase film having thickness of 150 nm or 200 nm.

Turning now to specific components, the separation medium comprises a nanoparticle support formed of individual nanoparticles. Any type of nanoparticle not inconsistent with the objectives of the present invention can be used. Nanoparticles of the support can be inorganic or organic. In some embodiments, organic nanoparticles include, but are not limited to, carbon nanotubes, carbon nanocones, carbon nanodiscs, fullerenes, graphene and derivatives thereof. Carbon nanotubes comprise single-walled carbon nanotubes and multi-walled carbon nanotubes. In other embodiments, inorganic nanoparticles can include metal or alloy nanowires and/or quantum dot particles foiiiied of semiconductor compositions such as Group III/V materials, Group II/VI materials or ternary and quaternary derivatives thereof. Quantum dot structures, in some embodiments, can be rod-shaped or rice-shaped. Individual nanoparticles of the support can have any dimensions not inconsistent with the objectives of the present invention. In some embodiments, single-walled carbon nanotubes have an average diameter of 1-5 nm prior to functionalization with the oligomeric stationary phase. In other embodiments, multi-walled carbon nanotubes have an average diameter of 5-10 nm prior to functionalization with the oligomeric stationary phase. Carbon nanoparticles can also exhibit a variable intraparticle diameter, such as in the case of carbon nanocones. In some embodiments, the nanoparticle support is formed of the same type of nanoparticles. In other embodiments, nanoparticles of the support have differing shapes and/or structural identity. Nanoparticle identity, for example, can vary according to position in the support. Structural identity of the individual nanoparticles can be selected according to several considerations including, but not limited to, interaction of the nanoparticles with the oligomeric stationary phase, packing characteristics of the nanoparticles and/or mechanical properties imparted by the nanoparticles.

The separation medium also comprises an oligomeric stationary phase forming a film on individual nanoparticles of the support, the film having thickness of 1 nm to 100 nm. In some embodiments, the film has thickness selected from Table I.

TABLE I

| Oligomeric Stationary Phase Film Thickness (nm) |
| --- |
| 2-50 |
| 3-30 |
| 2-20 |
| 5-30 |
| 5-15 |
| 7-15 |
| 7-10 |
| 10-50 |

In some embodiments, oligomeric chains of the stationary phase are covalently bonded to the individual nanoparticles. In such embodiments, the covalently bonded oligomeric chains form the stationary phase film coating the individual nanoparticles. The oligomeric stationary phase film, in some embodiments, conforms to surface geometry and/or structures of the individual nanoparticles. The oligomeric chains can have any length not inconsistent with the objectives of the present invention. In some embodiments, the oligomeric chains comprise 10-100 monomer units or 5-50 monomer units. Moreover, the oligomeric chains can include one or more cationic moieties for anion exchange. The cationic moieties can have compositional identity to provide a strong anion exchange medium or weak anion exchange medium. Cationic moieties, for example, can comprise quaternary ammonium groups. Alternatively, the oligomeric chains can comprise one or more anionic moieties for cation exchange. Anionic moieties can have compositional identity to provide strong cation exchange medium or weak cation exchange medium. In some embodiments, for example, anionic moieties include sulfonic acid groups, carboxylic acid groups and corresponding salts and/or derivatives thereof. In further embodiments, oligomeric chains can be neutral, wherein charged moieties are absent on the oligomeric chains.

Figure 2A:
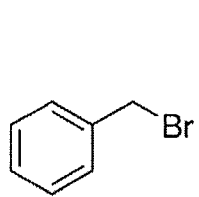
FIGS. 2A-2C illustrate the chemical structure of chemical constituents used to synthesize nanomaterials according to some embodiments described herein.
Figure 2B:
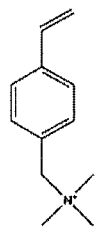
Figure 2C:
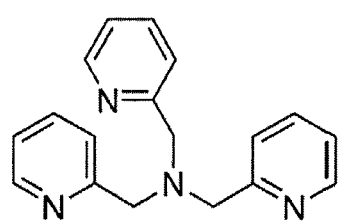
Figure 6:
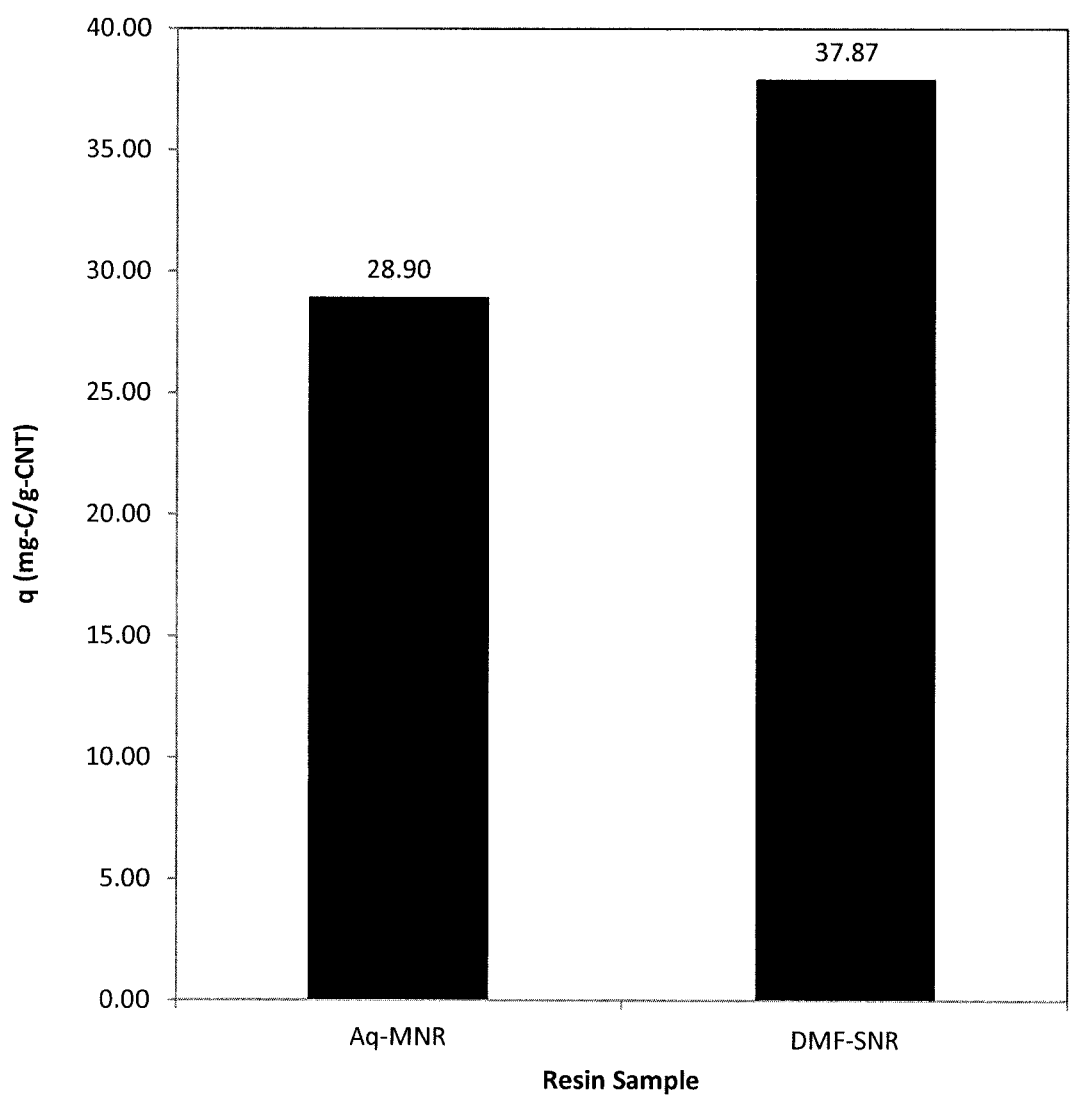
FIG. 6 is a graphical illustration of the adsorption dependence of a nanomaterial according to some embodiments described herein.
Figure 7A:
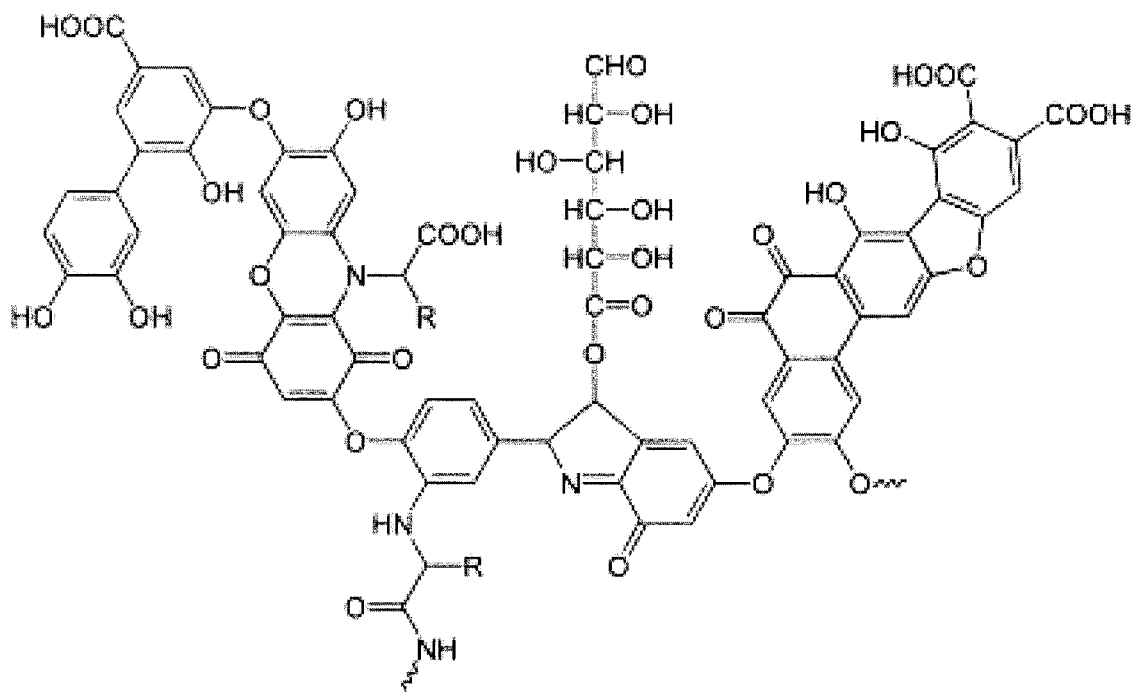
FIGS. 7A-7B illustrate the chemical structure of exemplary NOM adsorbents that are targeted by nanomaterials according to some embodiments described herein.
Figure 7B:
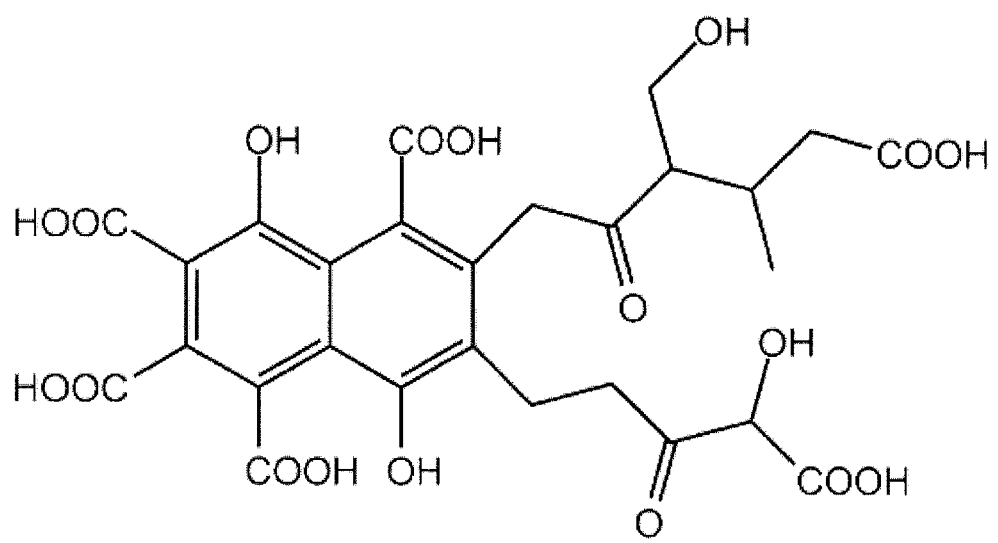

The oligomeric stationary phase, in some embodiments, is not cross-linked. Oligomeric chains can be independent of one another and do not share any cross-linking bonds. FIG. 1 illustrates an individual carbon nanoparticle covalently functionalized with oligomeric chains comprising quaternary ammonium cationic moieties for anion exchange according to one embodiment. As illustrated in FIG. 1, a stationary phase film 104 is formed by the individual oligomeric chains 104A, 104B, 104C, to 104N (i.e., where "N" is a whole number integer >3) covalently bonded to the lattice 102 of the individual nanoparticle 100. The individual oligomeric chains each comprise quaternary cationic moieties 106 for anion exchange, such as anionic exchange with NOM and/or metal species in a liquid or water source (also referred to as "target species" or "adsorbents"), including the humic acid NOM species illustrated in FIGS. 7A-7B. As described further herein, individual nanoparticles of FIG. 1 can be covalently functionalized with the starting materials in FIGS. 2A-2C. For functionalization in an aqueous environment, the initiator and transition metal catalyst of FIGS. 3A-3B respectively can be employed with the vinyl-benzyl trimethyl ammonium chloride (VB-TMAC) monomer. Example 2 discussed hereinbelow provides further detail regarding formation of the oligomeric stationary phase on individual nanoparticles of the support, and FIG. 6 is a graphical illustration of the adsorption dependence of a nanomaterial according to some embodiments described herein.

FIG. 4 is a scanning electron micrograph of single walled carbon nanotubes functionalized with oligo(vbTMAC) according to one embodiment. As illustrated in FIG. 4, the oligo(vbTMAC) forms a layer over and around nanoparticles surfaces. The layer generally has thickness of 5-20 nm. FIG. 5 characterizes carbon nanotube diameter before and after functionalization with the oligomeric stationary phase. Nanotube diameter increases from 5-20 nm subsequent to functionalization with the oligomeric stationary phase.

In another aspect, water treatment devices are described herein. A water treatment device comprises a membrane and a separation medium coupled to the membrane, the separation medium comprising a nanoparticle support and an oligomeric stationary phase forming a film on individual nanoparticles of the support, the film having thickness of 1 nm to 100 nm. In some embodiments, the membrane is a hollow permitting the coupling of the separation medium to interior and/or exterior membrane surfaces. The separation medium can have any construction described herein.

Figure 8A:
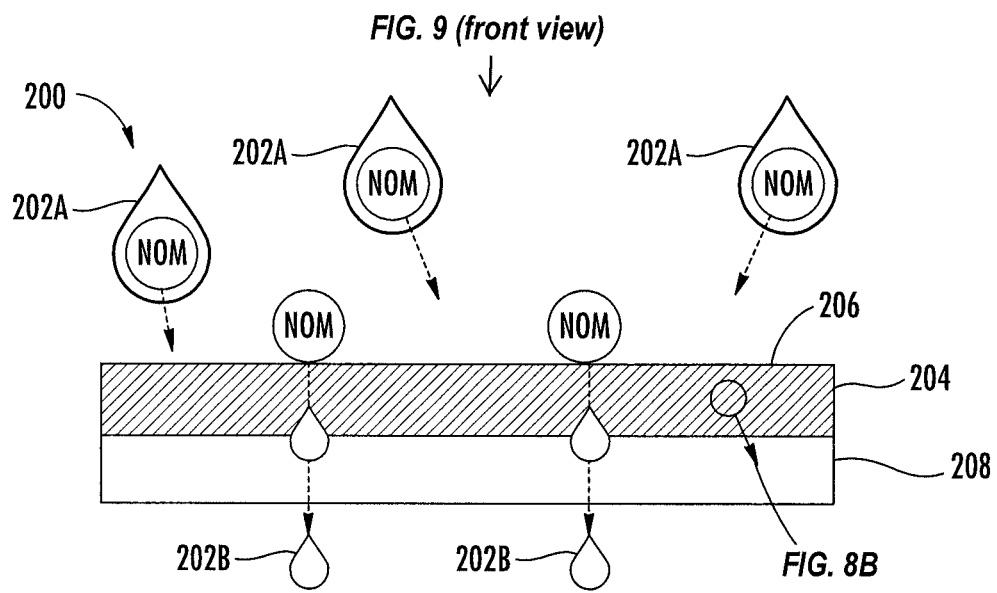
FIGS. 8A-8B schematically illustrate devices comprising nanomaterials according to some embodiments described herein.
Figure 8B:
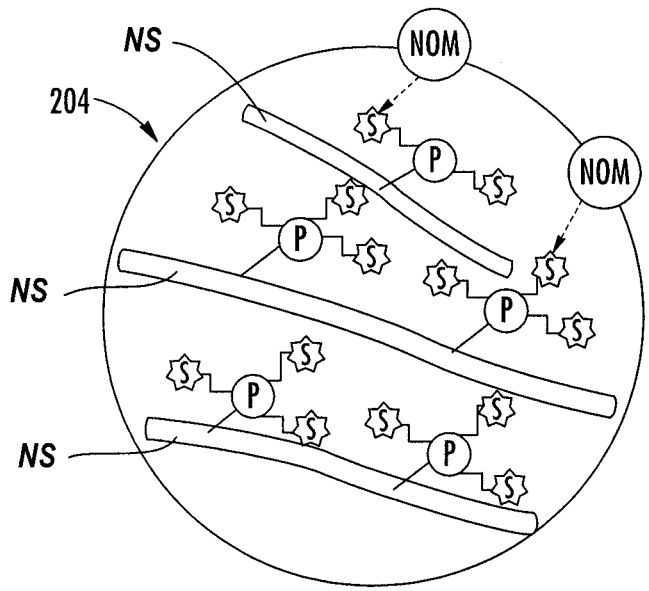
Figure 9:
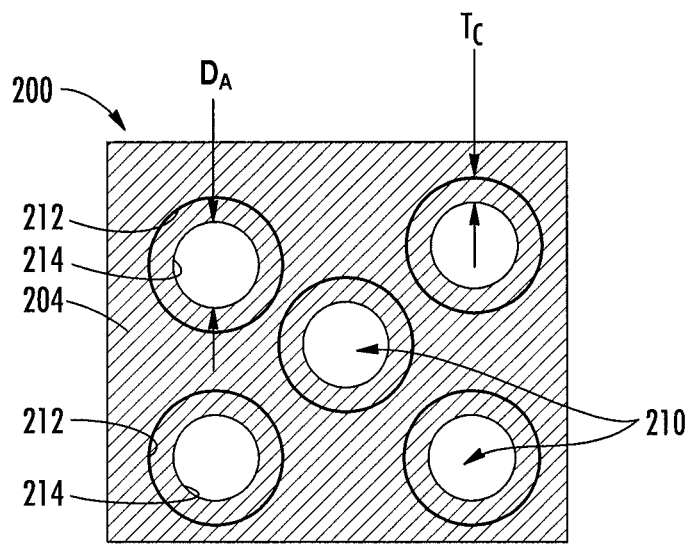
FIG. 9 schematically illustrates a device comprising nanomaterials according to some embodiments described herein.

FIGS. 8A-9 schematically illustrate a water treatment device generally designated 200 according to some embodiments described herein. Referring to FIG. 8A, the device 200 is configured to remove contaminant species, including NOM, from a volume of water via adsorption. For example, as contaminated water 202A contacts device 200, NOM adsorbs to one or more surfaces of the device so that clean, treated water 202B can then pass across and/or through the device.

In some embodiments, the device 200 comprises a permeable or semipermeable device for filtering, cleaning, purifying, and/or otherwise treating contaminated water 202A. Device 200 includes a separation medium 204 disposed on or over a membrane 208. Separation medium 204 comprises a contact surface 206 configured to adsorb NOM and other contaminant species thereto via ion-exchange. Membrane 208 can comprise a semipermeable structure, for example, that is fibrous (e.g., woven, non-woven, etc.), non-fibrous, porous, or otherwise water-penetrable for allowing treated water 202B to pass through as NOM and/or other contaminants adsorb to one or more surfaces of the device 200. In some embodiments, separation medium 204 forms a coating on or over portions of membrane 208, the coating can comprise any desired thickness not inconsistent with the objectives of the present invention. Thickness of the separation medium coating can be selected according to several considerations including, but not limited to, operating environment of the water treatment device, desired levels of contaminant removal and flow characteristics of the device. In some embodiments, for example, the separation medium can have thickness of 1 µm to 10 mm. In the embodiment of FIG. 8A, the separation medium 204 initially contacts the contaminated water source. However, in other embodiments, the membrane 208 can be the first contact point with the contaminated water source. In such embodiments, the membrane 208 can have a pore structure designed to filter contaminants of specific size, thereby precluding clogging or disruption of the separation medium 204. The size exclusion nature of the membrane 208 can further enhance filtration and water treatment efficiencies of the device 200.

FIG. 8B is a schematic, zoomed-in view of separation medium 204 according to some embodiments. As FIG. 8B illustrates, separation medium 204 includes a plurality of nanoparticle support structures NS and an oligomeric stationary phase P forming a film on or over individual nanoparticles of the nanoparticle support structure NS. Oligomeric stationary phase P can be covalently bonded to nanoparticle support structure NS, and comprise one or more moieties for facilitating anion exchange or cation exchange with NOM particles and/or other charged species at active ion exchange sites S. That is, the ion-ion attraction between adsorbate (i.e., separation medium ion exchange sites S) and adsorbent (i.e., NOM) facilitates ion exchange therebetween for binding NOM to the surface of separation medium 204. Notably, after one or more uses of device 200 to treat water, NOM can be desorbed from separation medium 204 such that the separation medium can be regenerated and reused.

In some embodiments, the nanoparticle support structures NS includes a plurality of carbon nanoparticles such as carbon nanotubes (e.g., multi-walled, single-walled, etc.). The large surface area associated with the nanoparticles advantageously allows an increased number active ion exchange sites S to be formed thereon and over separation medium 204. Thus, NOM of various sizes can readily adsorb to the increased number of active ion exchange sites S, while the larger surface area prevents large NOM molecules from sterically blocking small NOM molecules. The open structure of the nanoparticles also enables easier access to the ion exchange sites S along the length thereof. As FIG. 8B further illustrates, the oligomeric stationary phase P can be covalently bonded to individual nanoparticle support structures NS and not cross-linked. This results in a completely open resin matrix which precludes intraparticle diffusion effect and making adsorption essentially a solvent diffusion-limited process whereby NOM and/or other contaminants can be removed on contact, or within seconds of contacting device 200.

FIG. 9 is a plan view of a front surface of device 200 according to some embodiments. Device 200 is a permeable or semipermeable device having a membrane including one or more openings or apertures 210 formed therein. Apertures 210 can extend a full or partial thickness of device 200. In some embodiments, the sides and/or surfaces of apertures 210 are coated with separation medium 204. For example, an inner surface or wall 212 of each aperture 210 can be coated with separation medium 204 having a coating thickness $T_C$. Thickness $T_C$ can have any value not inconsistent with the objectives of the present invention. NOM and/or other contaminants can adsorb on interior surfaces 214 of device and membrane. Thus, NOM can be adsorbed via multiple different surfaces disposed along multiple different axes and/or planes as a liquid flows across and/or through device 200 for improved NOM removal.

After being coated, apertures 210 can comprise an opening diameter $D_A$. Sizes for $D_A$ can be selected according to several considerations including operating environment of the device, desired flow rates through the device and desired contaminant removal efficiencies. Although a square or cubed device 200 is illustrated, in some embodiments, device 200 and respective membrane (204, FIG. 8A) is tubular, or any other shape that is not inconsistent with the instant disclosure. For example, device 200 can comprise a tubular filtering device, a thin planar (e.g., sheet) filtering device, or any other size and/or shape of device that is not inconsistent with the instant disclosure. Device 200 can be used alone, or in combination with other filtering devices in a filtering system, where desired. For example, one or more upstream filtration apparatus may be employed to remove larger contaminant particles unsuitable for interaction with the separation medium.

In some embodiments, device 200 is configured to adsorb NOM via ion-exchange so that more than about 80 percent (%) of NOM is removed from a volume of liquid, more than about 90% of NOM is removed from a volume of liquid, more than about 95% of NOM is removed from a volume of liquid, or up to about 100% of NOM is removed from a volume of liquid. Device 200 can remove organic NOM, inorganic NOM, transition metal contaminants, and/or contaminants containing humic acid, fulvic acid, trihalomethane, haloacetic acid, a carboxylate group, or a phenolate group.

Figure 16:
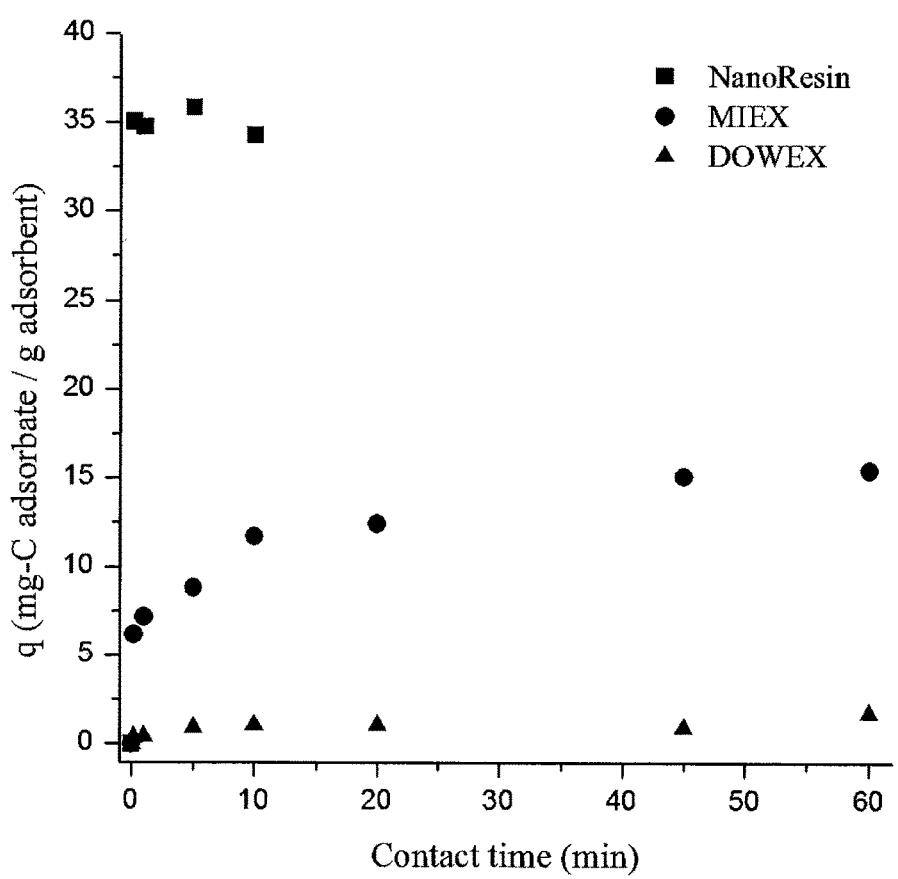
FIG. 16 is a graphical illustration of the absorption equilibrium rate for nanomaterials according to some embodiments described herein.

In a further aspect, methods of treating water are also described herein. A method of treating a water source comprises providing a water treatment device comprising a membrane and a separation medium coupled to the membrane, the separation medium comprising a nanoparticle support and an oligomeric stationary phase forming a film on individual nanoparticles of the support, the film having thickness of 1 nm to 100 nm. The separation medium is contacted with the water source and one or more contaminant species are removed from the water source by the separation medium. In some embodiments, contaminants removed from the water source include NOM and/or transition metals. Oligomeric chains of the stationary phase can comprise moieties for anion exchange or cation exchange. Nanoparticles and oligomeric stationary phase of the separation medium can have any structure and/or properties described herein. Given the high surface area and open structure provided by the separation medium, ion exchange equilibrium can be established between the separation medium and water source in less than 20 minutes or in less than 10 minutes. Such fast equilibrium rate is in stark contrast to presently available separation media wherein intraparticle diffusion mechanisms substantially retard equilibrium and interfere with efficient removal of contaminant species from the water source. As described herein, the oligomeric stationary phase can comprise one or more moieties for anion exchange or cation exchange. Contaminant interaction with the moieties, in some embodiments, is limited by solvent diffusion. Therefore, contaminants can be removed from the water source at high rates and high removal efficiencies. FIG. 16 discussed below illustrates rapid removal kinetics of a separation medium according to some embodiments. In some embodiments, for example, the separation medium removes greater than 90 percent of one or more contaminants from the water source. The one more contaminants can comprise natural organic matter, humic acid, fulvic acid and/or halogenated species including halogenated hydrocarbons, halogenated acids and salts and derivatives thereof. Contaminants may also comprise one or more transition metals or other metal elements.

After a specified period of time, the separation medium can be regenerated by treatment with one or more chemical species of sufficient strength to elute the contaminants. In some embodiments, contaminant removal efficiency is not compromised or degraded by the regeneration process. For example, contaminant removal efficiency of the separation medium does not deviate more than 5 percent between regeneration cycles. In some embodiments, the separation medium does not deviate more than 2 percent or 1 percent between regeneration cycles.

Some embodiments described herein are further illustrated in the following non-limiting examples.

EXAMPLE 1

Atom Transfer Radical Polymerization (ATRP) Reaction Conditions

Figure 10:
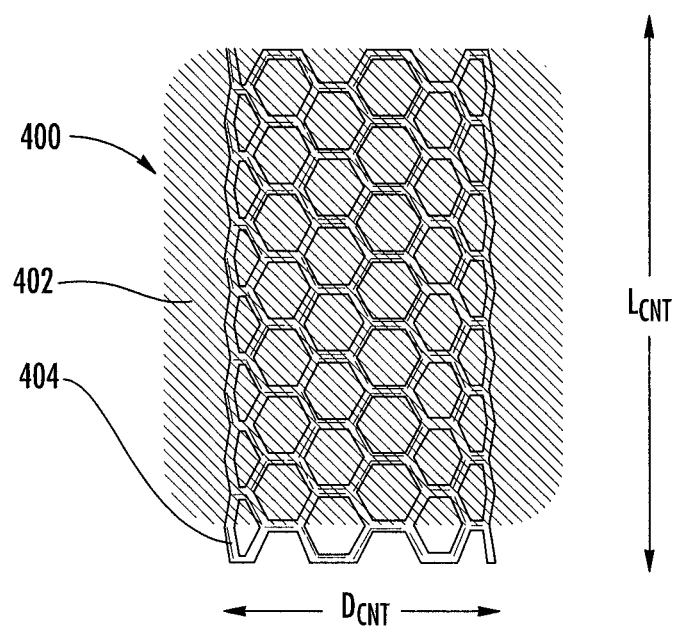
FIG. 10 schematically illustrates a nanomaterial according to some embodiments described herein.

FIG. 10 schematically illustrates an separation medium 400 ("NanoResin" in the present examples of the application) comprising oligomeric chains 402 covalently bonded to a CNT 402, in this case, a single-walled CNT (SWCNT). The oligomeric chains may include ion-exchange moieties to provide an Anion Exchange Resin (AER). Atom Transfer Radical Polymerization (ATRP) was used to synthesize the AERs described herein. The separation medium 400 includes a length $L_{CNT}$ and a diameter $D_{CNT}$. Length $L_{CNT}$ can comprise a length of about 10 nm to 2000 nm, for example, and any range thereof from about 100 nm to 2000 nm; 100 nm to 500 nm; 100 nm to 1000 nm; 100 nm to 1500 nm. Diameter $D_{CNT}$ can range anywhere from about 1-30 nm; 3-15 nm; 6-15 nm; or any diameters previously set forth in FIG. 5.

AERs, namely, Strong Base Anion (SBA) exchange resins, are basic enough to remove both strong and weak acids from a liquid, such as water. That is, SBA resins can remove all anionic contaminants present in a given volume of liquid, not just weakly ionized NOM.

Type I SBA exchange resins, with a chloride counterion, were synthesized and covalently bonded to CNTs to exploit the very large specific surface area (SSA) intrinsic to CNTs, including SWCNTs and multi-walled CNTs (MWCNTs). The CNTs act as scaffolding to support the resin, and without the CNT scaffold, the polymer strands would simply form a resin bead with a much smaller SSA. The CNT scaffold of the NanoResin is advantageous, as adsorbed material can be rinsed off and the NanoResin can be reused.

As FIG. 10 illustrates, the oligomer chains forming the AER provide a conformal coating on and/or over the SWCNT and/or surfaces thereof. Notably, the longer oligomer chains of the AER can cover more area along the SWCNT and therefore, fewer are needed to coat the SWCNT. The ion-exchange oligomer includes a plurality of active ion exchange sites that adsorb NOM, and 0% cross-linking between adjacent polymer chains attached to the SWCNT was observed.

FIG. 11 illustrates the basic stepwise reaction mechanism of ATRP used to synthesize the oligomer chains covalently bonded to CNTs for forming the NanoResin and devices incorporating the NanoResin according to embodiments described herein. ATRP was the chosen method for synthesis of the resin due to the versatility and adaptability of the method.

In FIG. 11, ATRP initiation occurs when the catalyst complex, consisting of a transition metal complexed with a ligand, $M_t^z/L_n$, abstracts a halogen atom from the alkyl halide initiator, R—X, creating an active radical species, R•, and an oxidized catalyst complex, $X-M_t^{z+1}/L_n$. This is a reversible step with a forward rate constant of $k'_{act}$, and a reverse rate constant of $k'_{deact}$. The radical special then reacts with the double bond of the vinyl monomer, M, to irreversibly form the first active polymer adduct, R-M•, with a rate constant of $k_i$. The chain is then reversibly deactivated through the back-transfer of the halogen atom from the catalyst complex; leaving a dormant chain, R-M-X, and the reduced catalyst, $M_t^z/L_n$. This back transfer completes the redox cycle of the catalyst complex, allowing it to complete the process again.

After initiation, propagation proceeds for growing the ionic oligomeric chains to a desired length. In some embodiments, the oligomeric chains comprise 10-100 monomer units. According to FIG. 11 and during propagation, the catalyst species begins in the lower oxidation state, $M_t^z/L_n$, where it can re-abstract and activate the polymer chain, with a rate constant of $k_{act}$. This leaves the catalyst complex in a higher oxidation state, $X-M_t^{z+1}/L_n$, and an active radical chain, R-M•. The active chain can then propagate via the addition of a subsequent unsaturated monomer unit, with rate constant of $k_p$. Deactivation follows once again by back-transfer of the halogen atom from the catalyst to the active chain, with a rate constant of $k_p$, leaving the catalyst in the deactivated state, $M_t^z/L_n$, and a dormant oligomer chain, $R-M_n-X$.

Throughout the propagation process, termination reactions ($k_t$) will inevitably occur, but in a well-controlled ATRP reaction, only a small percentage of the ionic oligomer chains will terminate. These reactions are primarily the result of bimolecular termination or catalyst disproportionation. Bimolecular termination occurs when two active chains combine (ex: $R-M_n•$ and $R-M_m•$) to give an irreversibly dormant chain, $R-M_n-M_m-R$. This termination results in a buildup of the oxidized catalyst species, $X-M_t^{z+1}/L_n$, which slows the overall rate of the reaction. Disproportionation of the catalyst complex can also result in an increase in $k_r$. This happens when the transition metal catalyst complex is in its lower/activating oxidation state is simultaneously oxidized and reduced, instead of activating the alkyl halide. For example, using a copper catalyst, $Cu^I$ should activate, but when undergoing disproportionation, $Cu^0$ and $Cu^{II}$ are formed. Since copper catalysts are most commonly used for ATRP, all further examples and figures will be based on a copper catalyst.

If initiation is fast and termination is negligible, in the absence of $O_2$, then well-defined oligomers with narrow molecular weight ranges will formed. Equilibrium exists between active (radical) chains and dormant (halide-capped) chains, as:

$$K_{ATRP} = \frac{k_{act}}{k_{deact}} \quad \text{Eq. 1}$$

To limit bimolecular termination, the concentration of active radicals is kept low, therefore the majority of the chains are dormant at any given time, and the equilibrium is shifted to the left ($k_{deact} \gg k_{act}$). This means that a low concentration of radicals is required to propagate a large number of oligomer chains. To ensure that all oligomer chains have the same probability of adding a monomer unit, $k_{deact}$ must be significantly higher than the rate constant for propagation; if this is true, greater control and a much more narrow range of molecular weights can be achieved. The rate law of ATRP, $R_p$, relates directly to the equilibrium constant and is defined as:

$$R_p k_p [M][R-X] \frac{k_{act}[Cu^I X/L]}{k_{deact}[Cu^{II} X_2/L]}, \quad \text{Eq. 2}$$

where [M] is the monomer concentration, [R—X] is the concentration of dormant chains (X is the initiator halide), [$Cu^I X/L$] is the concentration of the activating catalyst species (L is the catalyst ligand), and [$Cu^{II}X_2/L$] is the concentration of the deactivating catalyst species in the system. Since the majority of chains in a well-controlled ATRP system are dormant, [R—X] can be approximated based on the initiator concentration. The rate of polymerization will slow as monomer concentration decreases and is converted into. oligomer. ATRP is a first-order kinetic process with respect to monomer concentration, as long as termination is minimal, and a constant concentration of the active catalyst species is maintained. The most controllable aspect of the rate of polymerization is via $K_{ATRP}(k_{act}/k_{deact})$. Aside from the ratio of active to dormant chains, equilibrium is controlled by five parameters: initiator structure/leaving atom, catalyst (transition metal and ligand), solvent, temperature, and pressure.

All ATRP monomers have an accessible, terminal, (vinyl) double bond. Types of vinylic monomers used in ATRP synthesis include, acrylamides, acrylates, acrylonitrile, dienes, methacrylamides, methacrylates, styrenes, and derivatives thereof. Each monomer has an intrinsic ATRP equilibrium constant based on the system's activating and deactivating species that requires optimization to maintain polymerization control. A monomer's ability to stabilize radicals through resonance and inductive effects increases its equilibrium constant. However, since a monomer is typically chosen based on structure or functional groups, it may be necessary to change other components of the system to maintain control.

An initiator dictates the number of polymer chains in an ATRP system based on the initial ratio of monomer to initiator ($[M]_0$:$[R-X]_0$). From this ratio, the theoretical molecular weight or degree of polymerization (DP) can be determined by:

$$DP = \frac{[M]_0}{[R-X]_0} \times (\text{conversion}), \quad \text{Eq. 3}$$

where molecular weights increase linearly with conversion. To maintain control over polymerization and maintain a narrow range of molecular weights, initiation is fast to ensure consistency in the number of propagating chains. Initiators have a direct effect on the ATRP equilibrium constant, $K_{ATRP}$, based mostly on the leaving atom (halide) and initiator structure. The initiator effect on $K_{ATRP}$ is largely defined by the product of the equilibrium constants for homolytic bond dissociation of the initiator and the formation of the deactivating catalyst species (halidophilicity).

Another component in ATRP systems is the catalyst system, which can be thought of as a halogen transfer vehicle. Without this transition, metal catalyst radicals would not be formed, and controlled radical polymerization may not be achieved. While the rate of polymerization, Rp, is directly proportional to the concentration of the catalyst, there is no effect on the polymer's molecular weight. The catalyst controls activation and deactivation of growing polymer chains, therefore the ATRP equilibrium is directly linked to the catalyst system employed. Equilibrium constants too low can slow or stop polymerization, and too high can lead to increased polydispersity and a poorly controlled polymerization. ATRP catalysts are comprised of a transition metal center complexed with a stabilizing ligand.

A variety of transition metals have been successfully used for ATRP, such as nickel, ruthenium, aluminum, iron, and copper, however; copper is the most widely used in ATRP catalyst systems and will be the focus in the examples herein. The two oxidation states of the copper catalyst serve complimentary purposes; the copper (I) complex creates active oligomer chains through abstraction of the halogen atom from the dormant species and allowing propagation, subsequently the copper (II) complex deactivates oligomer chains through back-transfer of a halogen atom after the addition of a small number of monomer units promoting a well-controlled polymerization. This dynamic relationship between active and dormant chains intrinsic to the catalyst system being used can maintain polymerization control.

Choosing the correct ligand can provide the desired ATRP equilibrium constant. While the monomer and initiator both have significant effects on $K_{ATRP}$, they are typically predetermined based on desired polymer structure. However, the ligand can be adjusted to obtain an optimal equilibrium constant. The ligand in an ATRP catalyst complex serves to solubilize transition metal salts, to increase the reactivity of the metal center through electron donation, and to stabilize the catalyst complex. Nitrogen-based polydentate ligands were determined to be the most activating ligands for copper-based ATRP, and they control the equilibrium position through both electronic and steric mechanisms. The steric effect comes by reducing the rate of activation of the catalyst system, by making it more difficult for the halogen atom to interact with the metal center. The more prominent factor affecting catalyst activity is from stabilizing the deactivating ($Cu^{II}$) catalyst species via electron donation by the ligand Another factor relating to the catalyst is the choice of the starting halide salt; this factor is based on the relative bond strength of the carbon-halogen and copper-halogen bonds that a repeatedly formed and broken during ATRP. C/Cu—X bonds are typically weaker in bromine (Br) ATRP, allowing for a more efficient polymerization that can be conducted at lower temperatures.

ATRP can be conducted on neat monomer or within a solvent. Solvents may be necessary due to solubility issues; either the polymer is not soluble in its monomer, or the monomer being polymerized is solid at reaction temperatures. Aprotic solvents, solvents that do not contain O—H or N—H groups that would allow hydrogen bonding, are primarily used for ATRP. More recently, aqueous/protic solvent systems are used to synthesize water soluble polymers, or to move away from traditional ATRP solvents that may be volatile or hazardous. Water is safe, inexpensive, and environmentally benign.

Activators Re-Generated by Electron Transfer (ARGET) is the mechanism used to reduce copper concentrations in ATRP. ARGET ATRP relies on the same basic mechanism as traditional ATRP, but allows copper concentrations to be lowered to the parts per million levels through the use of an environmentally benign reducing agent, the simplified reaction kinetics are depicted in FIG. 12.

ARGET ATRP employs a reducing agent to continuously produce "activators" ($Cu^I$ from $Cu^{II}$), thus, not only does ARGET lower the catalyst concentration to part per million levels (with respect to monomer), but it also practically eliminates the need for catalyst removal upon reaction completion. The rate of polymerization also governs ARGET ATRP as the rate depends on the ratio of $[Cu^I]$ to $[Cu^{II}]$ and not the actual concentrations of each. While the rate of the reaction maintains the same in comparison to traditional ATRP, greater control can be achieved as many of the side reactions that limit molecular weight are inherently minimized with the lower catalyst concentration via ARGET ATRP.

ATRP is a versatile polymerization mechanism that allows a great degree of tunability depending on the system being used. Parameters can be optimized according to the desired degree of polymerization and reaction time while maintaining control of polymerization. In this way, oligomers of desired length can be produced. ARGET ATRP as used herein provided a significant improvement over traditional ATRP by drastically lowering the catalyst concentration without altering polymerization rates or sacrificing control. This advancement makes ATRP a much more environmentally friendly process that can also be conducted in the presence of limited amounts of $O_2$ also making it a viable industry technique.

Once oligomer synthesis was complete, the same mechanism for propagation was used to covalently attach the ionic oligomer (e.g., the synthesized AER) to SWCNTs thereby forming the NanoResin. The adaptability of this method allowed for a simple, one-pot synthesis of the ionic species that is covalently bonded to SWCNTs described herein for forming NanoResin nanomaterials.

EXAMPLE 2

Aqueous Synthesis of NanoResin

NanoResin materials, devices, and methods described herein can remove potentially hazardous DBP precursors from water before chlorination via adsorbing the precursors to active sites or surfaces on the NanoResin. Type I strong base anion (SBA) exchange resins synthesized via ARGET ATRP are an ideal choice for the ionic species of the NanoResin for NOM removal without increasing the corrosivity of the water and without further chemical addition. Ion exchange (IEX) has proven to be more effective at removing NOM than both coagulation and activated carbon.

For the removal of NOM, a Type I SBA with a quaternary ammonium functional group (oligo(vbTMAC)) was synthesized using traditional ATRP and ARGET ATRP described in Example 1 in both N,N-dimethylformamide (DMF) and water. The synthesized AER was then covalently attached to a SWCNT, or a surface thereof, which provided a scaffold for the resin. Without scaffolding, the polymer would free in solution with no way to remove or regenerate the materials for water treatment.

The CNTs were functionalized with the AER via the same mechanism used for ATRA/ATRP; however, instead of propagating through addition to an alkene on a vinylic monomer, polymers of a pre-determined length were added when an active oligomer chain reacts with a double bond on the carbon nanotube, functionalizing the tube with the polymer chain. The functionalized CNTs forming the novel and advantageous NanoResins described herein can then be incorporated on or in devices for filtering NOM from liquids, including but not limited to water.

AERs can be synthesized using both traditional ATRP and ARGET ATRP, in DMF and water, and with dispersed and non-dispersed SWCNTs. ATRP was chosen because the mechanism of propagation of the polymer is the same as the mechanism of functionalization of the nanotube. This allows for a predetermined degree of polymerization before adding SWCNTs so as to control polymer length, as well as the ability to complete the entire synthesis in a single reaction flask as schematically illustrated in FIG. 13.

Figure 13:
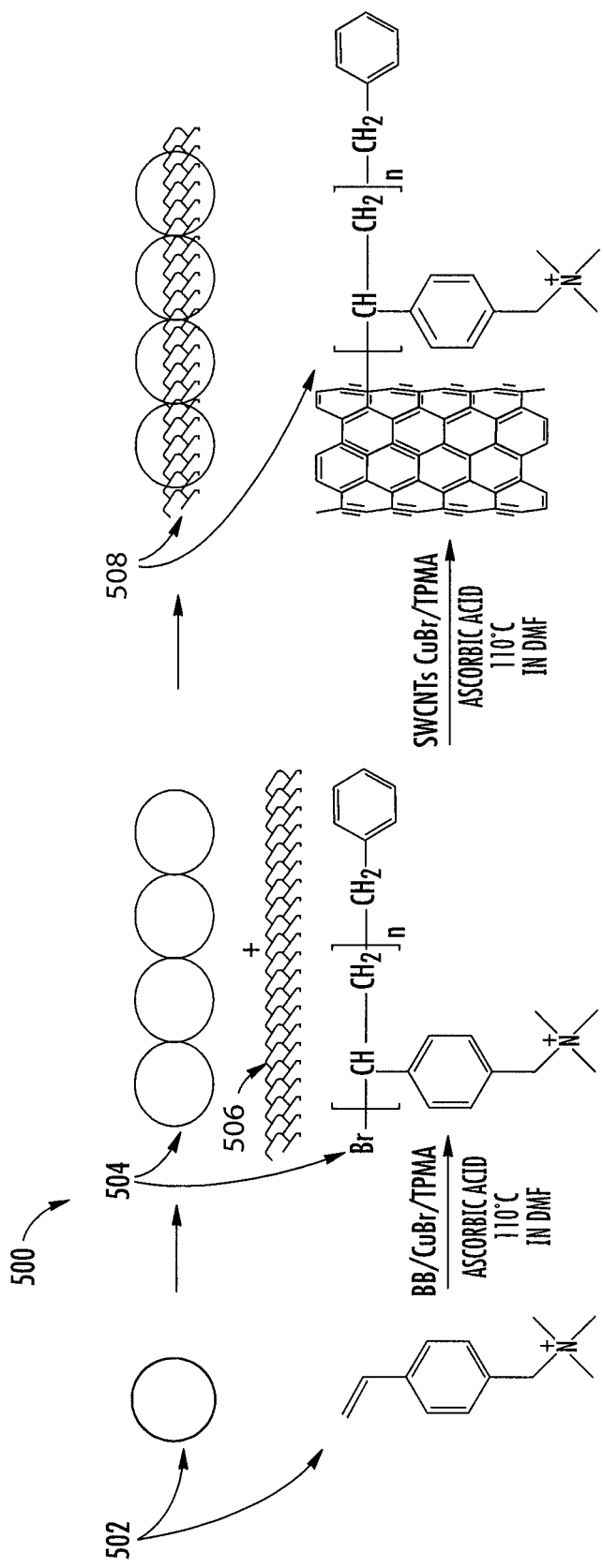
FIG. 13 schematically illustrates an exemplary embodiment of a polymerization mechanism for forming of a nanomaterial according to some embodiments described herein.

FIG. 13 schematically illustrates multiple steps in a method 500 for forming a nanomaterial. Nanomaterial 500 comprises a quaternary ammonium functional group monomer 502 (i.e., shown both schematically and structurally) polymerized via an ARGET ATRP mechanism to form a oligomer chain 504. The oligomer chain 504 forms as vbTMAC monomer reacts with a benzyl bromide/$Cu^{KK}Br_2$/TPMA initiating system and an ascorbic acid reducing agent. Multiple oligomer chains 504 can be synthesized for forming an AER that attaches to a SWCNT 506 via covalent bonds to form a nanomaterial 508. No crosslinking between and/or branching of the oligomer chains within the nanomaterial 508 occurs.

Synthesis of the ionic species (i.e., the AER) for NanoResin materials described herein includes utilizing a benzyl bromide/$Cu^{II}Br_2$/TPMA initiating system with ascorbic acid as a reducing agent. This increased the rate of polymerization/functionalization and reduced the amount of copper being used in the system. ARGET ATRP is a "green" process that uses trace amounts (<10 ppm) of a transition metal catalyst to prepare oligomers in a relatively narrow range of molecular weights, even in the presence of a small amount of air. Synthesis pathways can be completed in DMF and water. For both environmental as well as experimental reasons, it was decided that DMF was not the best solvent for AER synthesis. An aqueous synthesis would significantly reduce hazardous waste and simplify purification steps.

Figure 14:
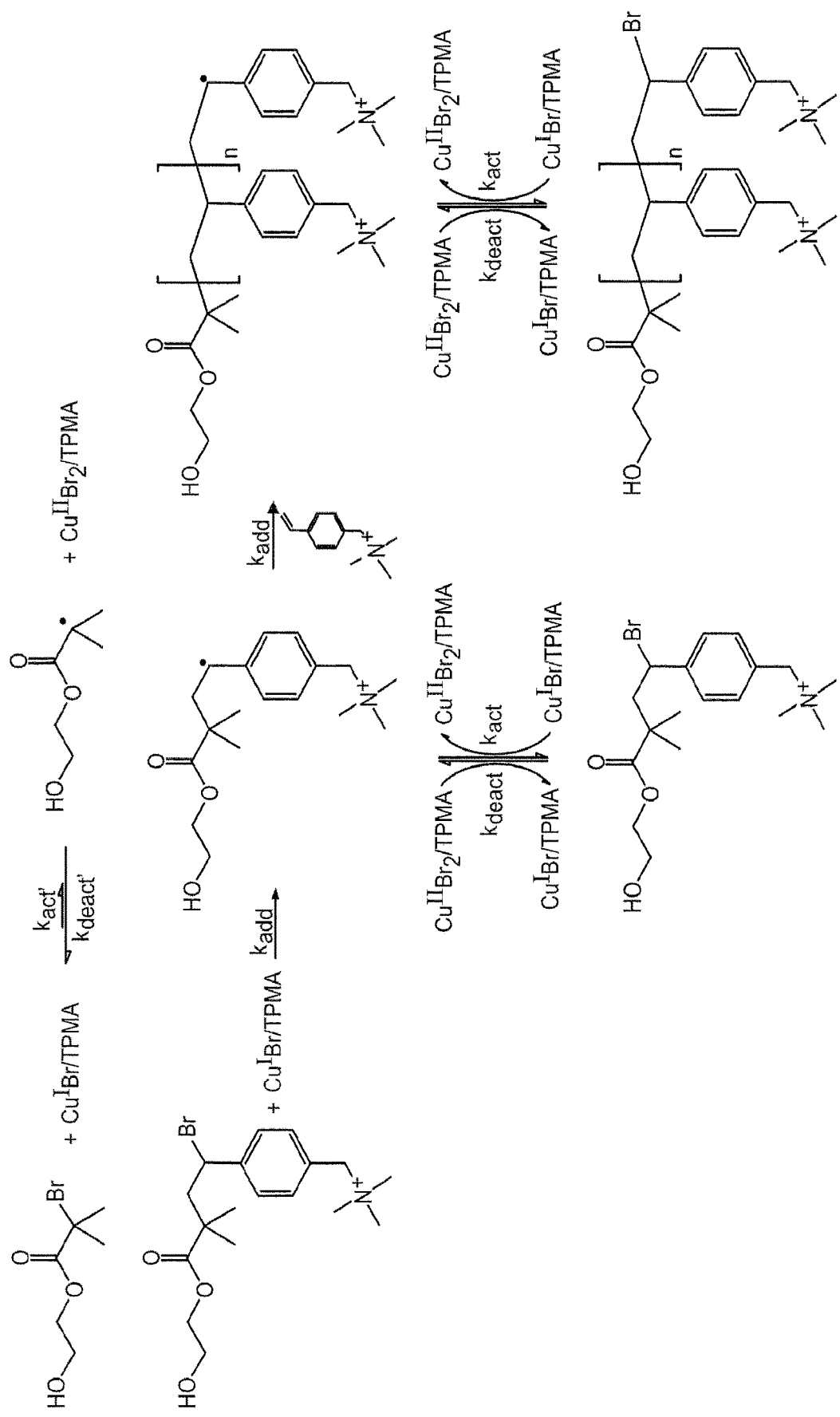
FIG. 14 schematically illustrates an exemplary embodiment of a polymerization mechanism for forming a nanomaterial according to some embodiments described herein.

The synthesis route evolved further from ARGET ATRP in DMF, to an aqueous synthesis depicted in FIG. 14. Aqueous ARGET ATRP employs a HEBiB/$CuBr_2$/TPMA initiating system and utilizes ascorbic acid as the reducing agent (i.e., where HEBiB is 2-hydoxyethyl 2-bromoisobutyrate; and TMPA is tris(2-pyridylmethyl)amine). Polymerization was performed under ideal ARGET ATRP conditions. All solutions were sparged with Ar for fifteen minutes before use. In a dry flask, under argon, vbTMAC (1.99 g, 9.40 mmol) was dissolved in water (4.00 mL), where vbTMAC is vinylbenzyl trimethylammonium chloride. The resulting mixture was stirred until fully dissolved. $CuBr_2$ (0.940 µmol) and TPMA (42.3 µmol) in water (2.350 mL) was added, followed by the addition of HEBiB (13.7 µL, 94.5 µmol). The reaction flask was then placed into a 90° C. bath of oil before adding 37.6 µmol of L-ascorbic acid (AA) to initiate the reaction. Polymerization was allowed to proceed for 30 minutes via the reaction scheme depicted in FIG. 14.

Nanotube functionalization was accomplished by adding 4.50 mg of high pressure carbon monoxide (HiPCO) SWCNT powder to 5.00 mL of degassed water, and ultrasonicating at 10 W RMS for 15 minutes before adding to the flask (still refluxing under argon). The catalyst complex and reducing agent was then recharged in the same ratio as polymerization, and the feed rate of AA was increased to 80 nmol/min. A tip ultrasonicator was then fixed in the reaction solution and sealed to prevent aggregation of SWCNTs during functionalization. The sonicator was kept at 5 W RMS for three hours and then removed. Functionalization proceeded for a total of 24 hours, at 95° C., before exposing the reaction flask to air and stopping the reaction.

Upon conclusion of the oligomer synthesis forming the NanoResin, the reaction flask was charged with 50-100 mL of solvent, and tip ultrasonicated at 15 W RMS for ten minutes. The reaction mixture was then filtered through a 0.45 µm polypropylene membrane using a vacuum filtration apparatus and washed with water to remove any excess oligomer, unreacted monomer, catalyst, or reducing agent.

Removing all non-covalently attached oligomers from the mixture is needed since free polymer would increase the apparent adsorption characteristics of the resin. Without addition of SWCNTs (i.e., no covalent attachment), the non-covalently attached polymer strands are easily filtered and removed from the sample as the polymer is completely soluble in water. FTIR revealed that the oligomer chains of the ionic species (AER) are strongly attached to the surface of the SWCNTs.

Once all excess oligomers and/or polymer had been removed, the retentate was added to DI water and tip ultrasonicated at 15 W RMS for 10 minutes. If the hydrophobic nanotubes were successfully coated in the hydrophilic polymer, they disperse into water. Once dispersed in water, the functionalized SWCNT dispersion was then ultracentrifuged at 20,000 g for 20 minutes to sediment any non-functionalized SWCNTs, and the supernatant was carefully collected and characterized as summarized below.

EXAMPLE 3

Characterization of NanoResin

Un-functionalized SWCNTs are not dispersible in water. The functionalized SWCNTs (i.e., functionalized with an ionic species (AER) and forming a NanoResin) disperse in water because the SWCNTs are coated in oligo(vinylbenzyl trimethylammonium chloride) (a Type I Strong Base AER). This allowed the functionalized SWCNTs to be easily separated from unfunctionalized SWCNTs. Once separated, multiple methods were used for characterization.

Polymerization was confirmed using Perkin-Elmer Spectrum 100 FTIR Spectrometer with ATR using solid samples. Nanotube functionalization (e.g., the covalent and permanent attachment between the ionic polymer and CNT) was confirmed with a Kaiser Raman Analyzer, dried samples were analyzed using 20 second exposures with three accumulations. SWCNT concentration in DMF was observed using a Cary 5000 UV-Vis-NIR Spectrophotometer at 1025 nm where only the SWCNTs absorb. Concentration of the AER was determined by solvent evaporation after purification. Scanning electron microscopy (SEM) data was obtained with a Raith 150 microscope operated at 10 kV, and was used to confirm a conformal polymer coating of the nanotube. SEM was also used to determine that individual tubes were being functionalized and that the conformal coating was covering the tubes. Details of such characterization methods are set forth in the thesis publication entitled "Synthesis and Characterization of Novel Anion Exchange Resin Coated Single-Walled Carbon Nanotubes for use in Water Purification", by Billy Ray Johnson, which is hereby incorporated by reference in its entirety.

The effective diameter and electrophoretic mobility of the functionalized CNT dispersions were measured using a Brookhaven Instruments Corporation Zeta-PALS system with the operating voltage set to 10 VRMS, and measurements were performed at 25° C. Functionalized CNT dispersions of 25 mg/L in water were sonicated prior to measurement.

The effective hydrodynamic diameter of the individual particles in dispersion was measured to be Dh=339+2 nm (all results reported as value±standard error, 95%). This value is calculated from the Stokes-Einstein relation where the particle is modeled as a sphere. Obviously, the functionalized CNTs are not spheres. If it is assumed the CNTs behave like rigid rods (even though they are actually flexible rods), that have cross-sectional width w=10 nm wide (as determined by SEM) and length L=1500 nm, then the calculated hydrodynamic diameter Dh is ~320 nm according to:

$$D_h = L/(\ln(L/w)-0.32),\ ^{76} \qquad \text{Eq. 4}$$

The measure electrophoretic mobility was µ=+1.85±0.08 ($10^{-8}$ $m^2$ $V^{-1}$ $s^{-1}$). From the electrophoretic mobility, zeta potential was calculated using the Smoluchowski model. The Smoluchowski approximation is used to account for the solvent's dielectric constant and viscosity and to calculate the zeta potential. In the instant system κa~6 where the Debye length 1/κ is estimated to be between 20-50 nm and the measured radius a=$D_h$/2=170 nm. The zeta potential was calculated to be ζ=+24±1 mV, which is consistent with a cationic polyelectrolyte coated SWCNT.

Figure 15:
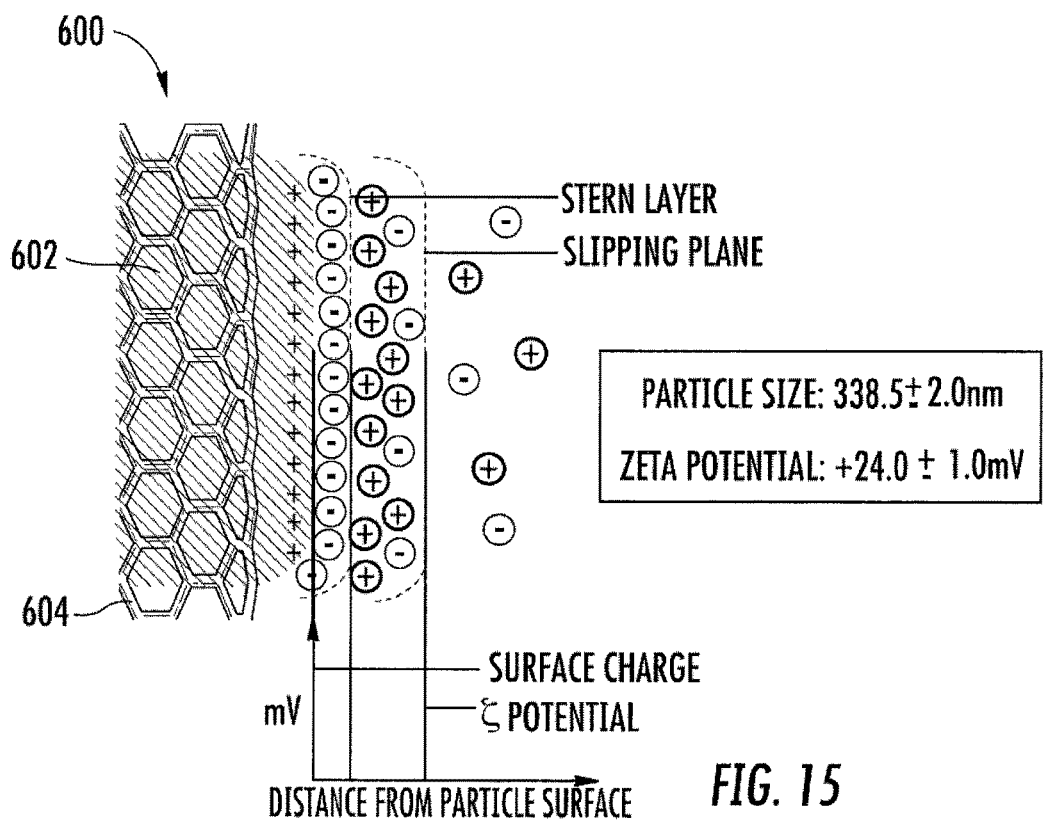
FIG. 15 illustrates the nanomaterial zeta potential according to some embodiments described herein.

FIG. 15 depicts the electrical double layer representation of the functionalized CNT resin, generally designated 600. The resin is comprised of nanoparticle 604 and an oligomeric stationary phase forming a film 604 on the individual nanoparticle 602. The potential measured at the shear plane is known as the zeta potential.

UV-Vis-NIR was used to determine the percentage of SWCNTs being functionalized during the synthesis; "percent functionalization." SWCNT concentration in DMF was observed using a Cary 5000 UV-Vis-NIR Spectrophotometer at 1025 nm where only the SWCNTs absorb. The extinction coefficient $\varepsilon_{1025}$=0.0247 $(mg/L)^{-1} \cdot cm^{-1}$ and the volume of dispersion were used to calculate the mass of SWCNTs before and after polymer functionalization to the SWCNTs. The percent functionalization, % F, is determined by the mass ratio of SWCNTs collected after purification to that added to the initial reaction. During synthesis using the ARGET ATRP method in DMF, functionalization showed a strong dependency of time. After 16 h of functionalization the % F=81%. This value is ~47% lower for shorter functionalization times of one or four hours.

NMR spectroscopy was used to monitor monomer conversion. It was observed that one particular reaction had reached 49% conversion in 150 minutes.

EXAMPLE 4

Comparison of NanoResin to Known AERs

Coagulation is ineffective at removing low molecular weight NOM. Experimental data suggested that only about 5% of low molecular weight compounds can be removed from drinking water via coagulation. Adsorption is thought to be superior to coagulation. Results in this section compare the NanoResin described herien to existing AERs. Existing AERs include DOWEX® resin beads available from The DOW Chemical Company, headquartered in Midland, Mich. and the highly crosslinked magnetic ion exchange resin MIEX®, also formulated as resin beads, available from Ixom, headquartered in East Melbourne, Australia.

Sodium fluorescein (NaFl) is a low molecular weight species that was used as a NOM surrogate for use in obtaining adsorption data. NaFl was chosen as a surrogate molecule for NOM due to structural similarities to fulvic acids and its strong absorbance in the visible region. A large majority of NOM has either carboxylate or phenolate groups, or both, leaving them as negatively charged species in water.

Adsorption Kinetics of a Low Molecular Weight (MW) Surrogate: FIG. 16 is a plot of the sorption kinetics of the NaFl surrogate DOC onto the NanoResin where the loading q (i.e., given in mg-C adsorbate per g adsorbent), is measured as a function of incubation time. A low MW NaFl solution was used because of the structural similarities to low MW humic substances, as well as the strong absorbance at 490 nm ($\varepsilon 490 = 0.3576+0.0106$ $(mg-C/L)^{-1} \cdot cm^{-1}$) allowing low residual concentrations (with a detection limit below 0.001 mg-C/L). It is these type of low MW (200-400 g/mol) DBP precursors that are most recalcitrant to coagulation and granular activated carbon (GAC) treatment that are being targeted by NanoResin. Treatment of aqueous NaFl with standard coagulation with aluminum sulfate at a dose of 3 mg/L as Al at pH 6.3 removed only about 5% of NaFl from a solution.

As FIG. 16 illustrates, NanoResin has far superior adsorption qualities (i.e., as measured by both the amount of NaFl being adsorbed and the time in which it is adsorbed) compared to existing AERs. "Pseudo-equilibrium" of NanoResin occurs after about 10 seconds of incubation. Comparatively, it takes more than 40 minutes for commercially available AERs to approach equilibrium. This is an advantage of the nanoscale nature of the NanoResin material. As particle size decreases, surface area (per mass) for adsorption increases, and the mass transfer length decreases; thus, the rate of ion exchange (IEX) increases. Internal diffusion of the adsorbate into the NanoResin is practically negligible due to the small thickness (~5 nm) of the ionic species or resin, as well as the lack of crosslinking between the oligomer strands. This results in a completely open resin matrix, making adsorption essentially a solvent diffusion-limited process.

The open resin structure of NanoResin is notably distinct from commercial resins, as the commercial resins must be crosslinked in order to form an actual resin bead that will not dissolve in water. Crosslinking in commercial resins forms pores of different sizes and the degree of crosslinking directly affects the size of the pores. There are two commonly used types of resins; microreticular (gel) resins, which have 4-10% of a crosslinker (divinyl benzene (DVB) is used with styrenic polymers), and macroreticular resins which have 20-25% crosslinking. While introducing pores to the resin structure increases the surface area and the number of active exchange sites, it significantly slows sorption kinetics because ions have to diffuse in and out of the resin structure. Since NanoResin has a completely open resin structure, it eliminates intraparticle diffusion and functions as a contact resin for adsorbing NOM on contact.

Figure 17A:
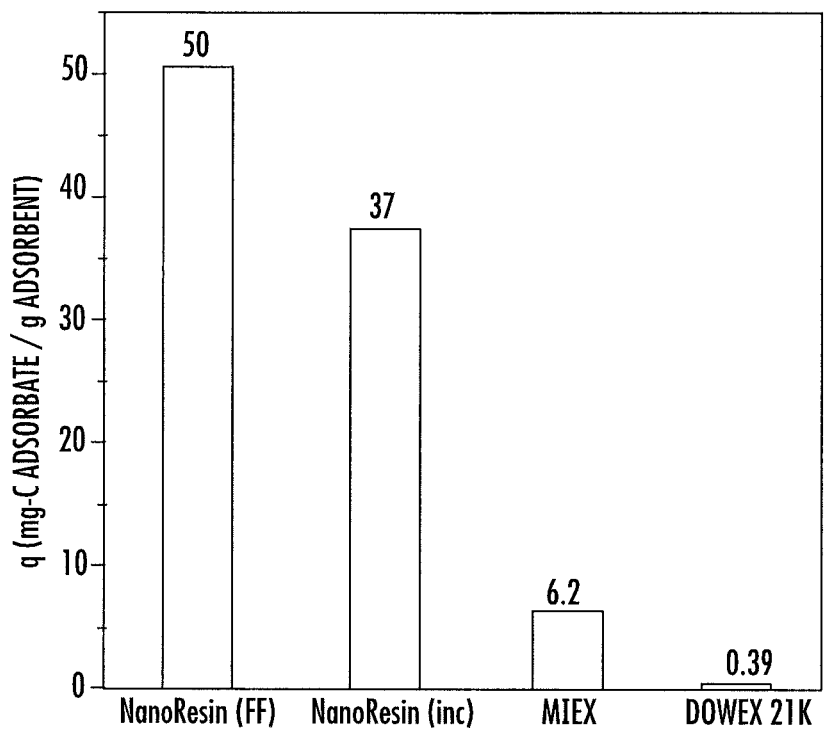
FIGS. 17A-17B are graphical illustrations of the adsorption capacity for nanomaterials according to some embodiments described herein.
Figure 17B:
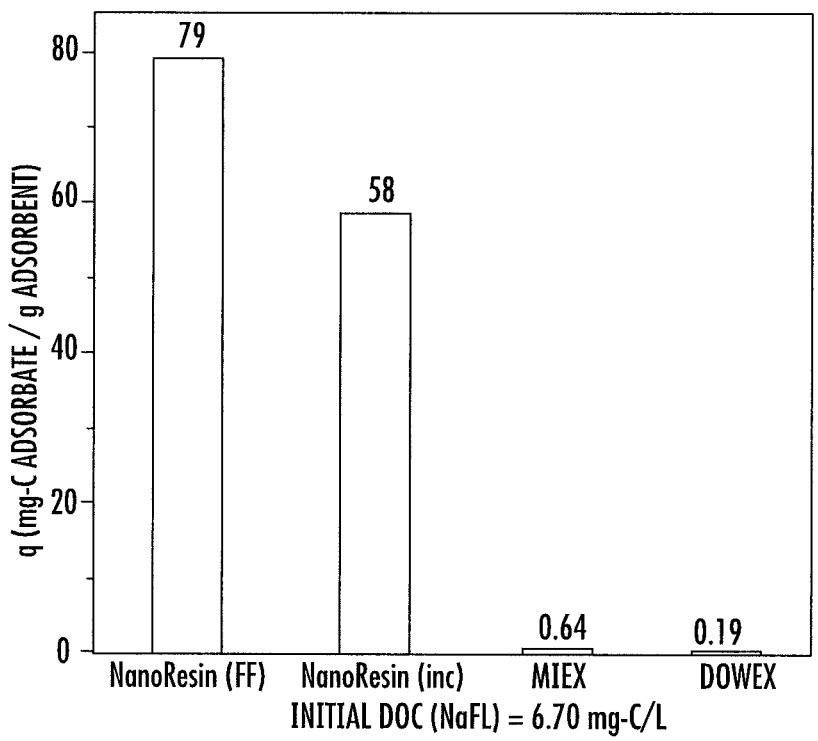

FIGS. 17A-17B compare the adsorption loading (q) of low molecular weight (MW) for "fast filtration" (FF) NanoResin, incubation (inc.) on a NanoResin film, MIEX®, and DOWEX®. "Fast filtration" and "incubation" methods refer to how the fluid containing the NOM surrogate is introduced to the NanoResin as described below.

A "fast filtration" method includes depositing a NanoResin on a semipermeable alumina ($Al_2O_3$) membrane with a glass microfiber pre-filter. Slowly pushing the NanoResin dispersion through the alumina membrane resulted in a smooth uniform film. The NanoResin film thickness across the membrane was self-limiting. Since the membrane resistance increases (decreasing flux) with the film thickness, heterogeneity is minimized. Control studies found no adsorption of NOM to filtration apparatuses without NanoResin. During "fast filtration", a known volume and concentration of NaFl was pushed through the adsorbent using a syringe. The concentration of the filtrate was then measured and compared to the initial NOM concentration.

An "incubation" method includes depositing a known mass of NanoResin onto a polypropylene support membrane to form a film. The support membrane was placed into a glass vial with the film facing the NaFl solution. A known concentration of NaFl was added to the vial. Samples were allowed to incubate in a tube rotator for five minutes before separating the surrogate solution from the adsorbent, and measuring the final NOM concentration.

FIGS. 17A-17B compare adsorption of low MW NOM surrogate (NaFl) during a 10 second exposure to NanoResin, MIEX®, or DOWEX® 21K. The initial NOM concentration for each trial was held constant and the specific loading capacity q was measured for different processes and different materials. Table II below contains the raw data depicted in FIG. 17A.

For each experiment, a controlled mass of NOM was interacted with the adsorbent. The specific loading capacity of the resins is reported as q (i.e., measured as mg-C adsorbate per g adsorbent). Fast filtration "FF" through a NanoResin thin film had the highest specific adsorption where 0.16 mg of NanoResin removed 8.31×10-3 mg-C of NaFL, with a specific capacity q=50 mg-C/g.

The 0.35 mg sample of MIEX® removed only 0.14×10-3 mg-C of NaFL under the same conditions. A 10 second incubation "inc." in dispersed NanoResin yielded q=37 mg-C/g whereas, the same incubation in dispersed MIEX® and DOWEX® 21K yielded a specific capacity of only 6.2 mg-C/g and 0.39 mg-C/g respectively. The high SSA and open structure of the NanoResin make it an attractive material for the rapid removal of refractory NOM. FIG. 17B demonstrates additional results.

TABLE II

Data from FIG. 17A; Low MW Adsorption after 10 second Incubation

| Adsorbent Media | Initial Surrogate Concentration (mg-C/L) | Final Surrogate Concentration; $C_f$ (mg-C/L) | Surrogate Volume (mL) | NaFL removed (mg-C) | Mass of Adsorbent (mg) | Q (mg-C adsorbate/ g adsorbent) |
|---|---|---|---|---|---|---|
| NanoResin (FF) | 5.01 | 2.24 | 3.00 | $8.31 \times 10^{-3}$ | 0.17 | 50 |
| NanoResin (inc.) | 6.70 | 5.03 | 1.75 | $2.91 \times 10^{-3}$ | 0.078 | 37 |
| MIEX ® | 6.51 | 5.93 | 1.75 | $1.09 \times 10^{-3}$ | 0.18 | 6.2 |
| Dowex ® | 6.51 | 6.49 | 1.75 | $8.55 \times 10^{-5}$ | 0.22 | 0.16 |

Figure 18A:
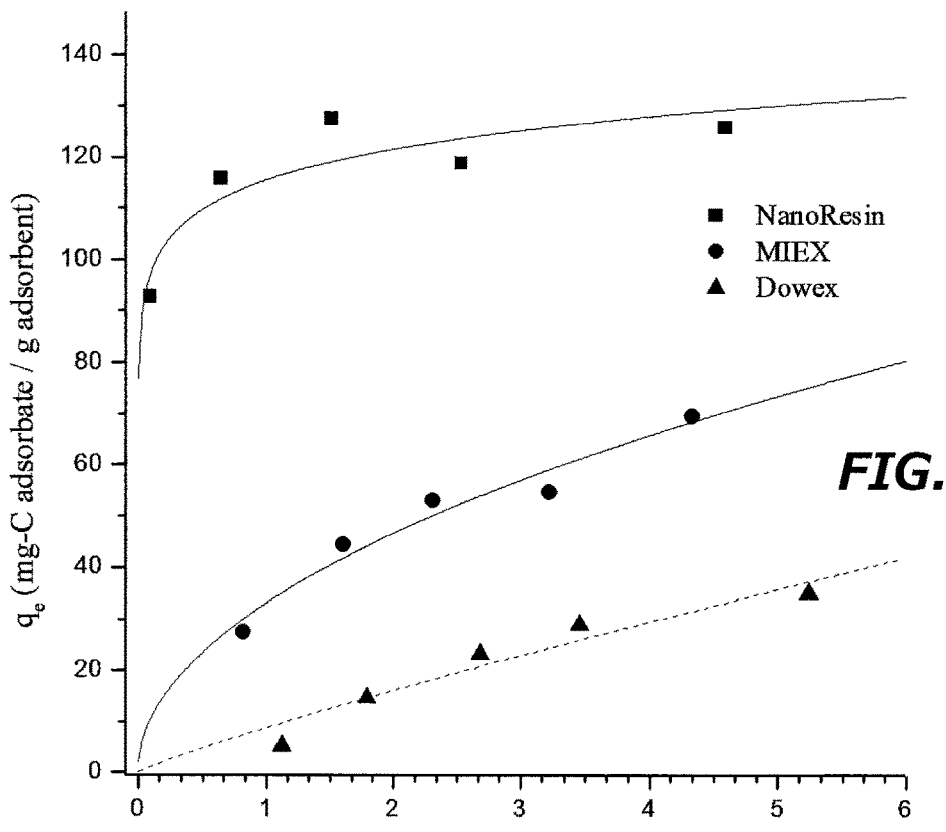
FIGS. 18A-18B are graphical illustrations of adsorption isotherms for commercially available adsorbents compared to nanomaterials according to some embodiments described herein.

Adsorption of a Low MW NOM Surrogate: FIG. 18A illustrates the adsorption isotherms for low MW surrogate introduced to NanoResin, MIEX®, and DOWEX® 21K. The raw data also presented in Table III below.

In FIG. 18A, the surrogate specific loading $q_e$ is plotted as a function of the equilibrium concentration $C_e$. The larger $q_e$ for the NanoResin adsorption isotherm is a result of the vast SSA and open resin matrix. Since the adsorbate does not have to diffuse through pores in the resin, adsorption is extraordinarily fast. In contrast, the MIEX® and DOWEX® beads include pores that significantly slow down the adsorption kinetics. All materials were allowed to incubate with the NOM for 15 hours. The Freundlich constant $K_f$ and exponent $1/n_f$ from non-linear fitting of the data to the function $q_e = K_f C_e^{(1/m_f)}$ where $K_f$ and $1/n_f$ represent the adsorption capacity and binding strength, respectively.

The $K_f$ for NanoResin is 116±3 (mg-C/g)(mg-C/L)$^{-1}$, and 33±3 (mg-C/g)(mg-C/L)$^{-1}$ for MIEX®. The DOWEX® 21K is a cross-linked, low SSA material. Between 15 and 24 hours of incubation the material adsorbs just 3% more NOM and as such a pseudo-equilibrium isotherm was obtained for DOWEX® 21K in FIG. 18A, with $K_f$=8.8±2 (mg-C/g)(mg-C/L)$^{-1}$.

The increase in accessible ion-exchange surface area, while increasing the surface area to mass ratio, allows NanoResin to adsorb a significantly greater amount of adsorbate, per mass. The larger $q_e$ near $C_{eq}$=0 indicates that the NanoResin can remove NOM more effectively, even at very low concentrations, where traditional granular activated carbon (GAC) treatment fails. Even after very long incubation time, and higher resin dose, MIEX® and DOWEX® are not as effective at removal of low MW NOM.

Removal of NOM to very low concentrations requires a large binding strength between the NOM and the adsorbent. The Freundlich exponent, $1/n_f$, was also determined by fitting the data in FIG. 18A to the Freundlich isotherm. The binding strength of the NanoResin material is larger than that of the other resin materials, and for NOM adsorbed to un-functionalized MWCNTs or GAC. The values for $1/m_f$ were 0.073±0.02, 0.49±0.07, 0.87±0.17, for the NanoResin, MIEX®, DOWEX® respectively, where the smaller value is associated with a stronger binding constant.

TABLE III

Data from FIG. 18A; Low MW Surrogate (NaFl) Adsorption Isotherm

| Adsorbent Media | Initial Surrogate Concentration (mg-C/L) | Final Surrogate Concentration; $c_{eq}$ (mg-C/L) | Surrogate Volume (mL) | Mass of Adsorbent (mg) | $q_e$ (mg adsorbate/ g adsorbent) |
|---|---|---|---|---|---|
| NanoResin | 1.20 | 0.0915 | 15.0 | 0.18 | 92.7 |
|  | 2.04 | 0.636 | 15.0 | 0.18 | 116 |
|  | 3.05 | 1.50 | 15.0 | 0.18 | 127 |
|  | 3.91 | 2.53 | 15.0 | 0.17 | 119 |
|  | 6.10 | 4.59 | 15.0 | 0.17 | 126 |
| MIEX ® | 1.20 | 0.815 | 15.0 | 0.22 | 27.4 |
|  | 2.04 | 1.60 | 15.0 | 0.15 | 44.5 |
|  | 3.05 | 2.31 | 15.0 | 0.21 | 53.1 |
|  | 3.91 | 3.22 | 15.0 | 0.19 | 54.6 |
|  | 6.10 | 4.34 | 15.0 | 0.37 | 69.6 |
| Dowex ® | 1.20 | 1.12 | 15.0 | 0.27 | 5.26 |
|  | 2.04 | 1.79 | 15.0 | 0.26 | 14.7 |
|  | 3.05 | 2.68 | 15.0 | 0.24 | 23.3 |
|  | 3.91 | 3.45 | 15.0 | 0.24 | 28.9 |
|  | 6.10 | 5.24 | 15.0 | 0.35 | 34.9 |

Figure 18B:
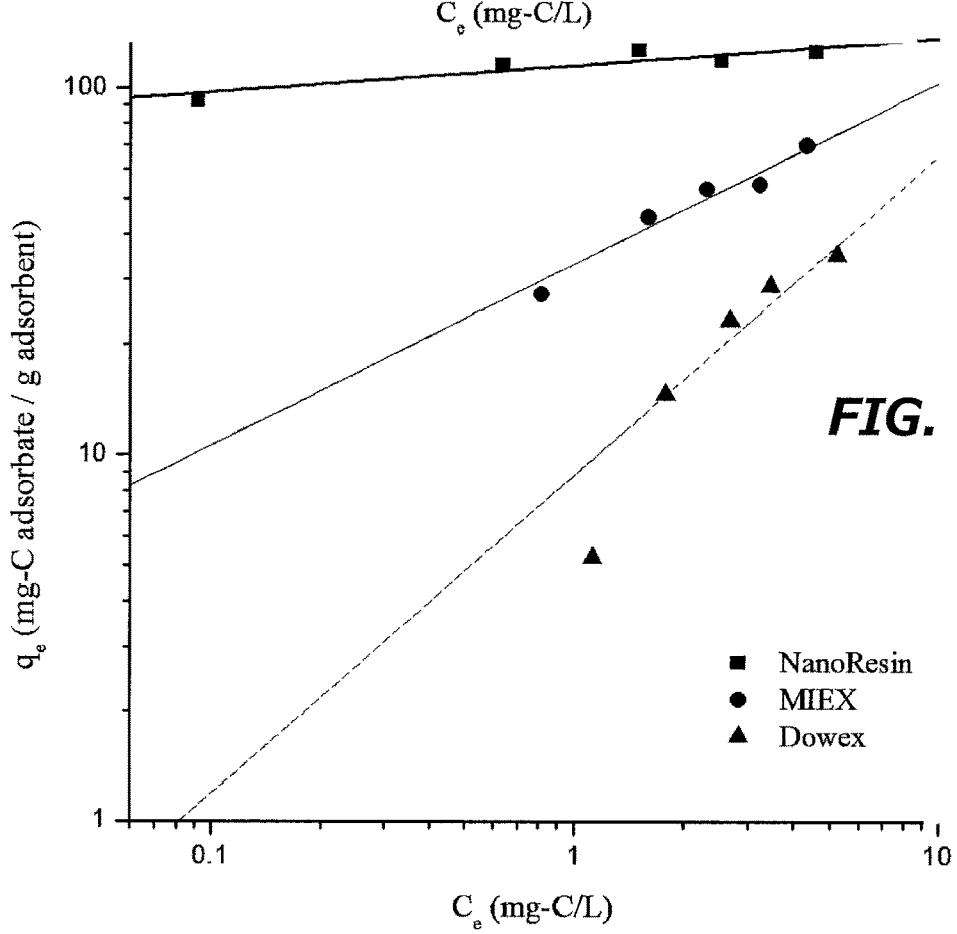

Log-log representation of the adsorption data is shown in FIG. 18B. When plotted as a log-log graph, all data are compared with a similar resin dose and adsorbent mass. As surface area increases (DOWEX®<MIEX®<NanoResin), more adsorbate can be bound per mass, much more efficiently. All samples were allowed to incubate for 15 hours. NanoResin and MIEX® achieved equilibrium within one hour. The line connecting the NanoResin data points in FIG. 18B is obtained via fitting the Freundlich isotherm to the data. The line connecting the DOWEX® data points in FIG. 18 is a non-equilibrium fit to the Freundlich isotherm.

Adsorption of Low and High Specific UV Absorbance (SUVA) Surrogates: Surrogate NOM removal from both low and high SUVA samples was compared. MIEX® is compared to two different NanoResin samples; one prepared by film incubation, and the other by dispersing the NanoResin and incubating the sample. All samples were allowed to incubate for 15 minutes to simulate the pseudo-equilibrium time for MIEX®.

A low SUVA surrogate was prepared from instant coffee powder, which has a MW profile similar to NOM, including a typical initial DOC concentration of 8.60 mg/L, and a UV254 absorbance of 0.1789 (2.08 $L \cdot mg^{-1} \cdot m^{-1}$ SUVA). Low SUVA NOM is very difficult to remove by coagulation and other traditional methods of treating water.

A high SUVA surrogate was prepared from ECO Super Hume—17% Humic Acid (13% fulvic, 4% humic), with typical initial DOC concentration of 11.28 mg/L, and a UV254 absorbance of 0.470 (4.16 $L \cdot mg^{-1} \cdot m^{-1}$ SUVA). Total organic carbon (TOC) was monitored by a Shimadzu TOC-L/CPN using standard method 5310 B.

Results were measured using both UV254 absorption, as well as TOC analysis before and after incubation to determine the amount of surrogate removed by each resin. Control studies without resin found no significant removal of NOM.

The data indicates that NanoResin has an increased adsorption capacity compared to the commercial resin. NanoResin is superior in adsorbing both high and low SUVA samples. The 15 minute incubation data is summarized in Tables IV and V below. The NanoResin film data collected in Tables IV and V below combined five separate adsorption experiments, with regenerating, and rinsing between each.

TABLE IV

Raw data from 15 minute, low SUVA surrogate adsorption experiments

| Adsorbent Media | Mass of Adsorbent (mg) | UV254 initial | UV254 Removal (initial – final) | (UV removal)/ (g adsorbent) (A.U./g) | UV254 % difference | (UV254 % difference)/ (g adsorbent) |
|---|---|---|---|---|---|---|
| NanoResin Dispersion | 0.51 | 0.0447 | 0.0339 | 65.9 | 75.9 | 1.47E5 |
| NanoResin Film | 0.30 | 0.1481 | 0.0183 | 40.2 | 11.0 | 1.35E5 |
| MIEX | 3.39 | 0.1789 | 0.0105 | 3.10 | 5.87 | 1.73E3 |
|  | 3.15 | 0.1789 | 0.0159 | 5.05 | 8.89 | 2.82E3 |

TABLE V

Raw data from 15 minute, low SUVA surrogate adsorption experiments

| Adsorbent Media | Mass of Adsorbent (mg) | Initial Surrogate Conc.; (mg-C/L) | Final Surrogate Conc.; $C_{eq}$ (mg-C/L) | TOC % difference | (% difference TOC)/ (g adsorbent) | $q_e$ (mg-C NOM)/ (g adsorbent) |
|---|---|---|---|---|---|---|
| NanoResin Film | 1.49 | 7.58 | 6.20 | 18.2 | 122.2 | 32.5 |
| MIEX | 3.39 | 8.60 | 8.03 | 6.63 | 19.6 | 6.19 |
|  | 3.15 | 8.60 | 7.71 | 10.3 | 32.8 | 9.56 |

From the TOC analysis, 0.30 mg of NanoResin film measured a specific adsorption $q_e$=32.5 mg-C/g. For a similar resin dose, the MIEX® sample had a specific adsorption of only 7.9 mg-C/g. The dispersed NanoResin sample showed the greatest removal of UV254 absorbing NOM. Without being bound by theory, the increase in adsorption capacity in NanoResin is thought to be due to the rapid ion exchange equilibration and increased quantity of binding sites available on the larger SSA and open resin matrix of the NanoResin material.

NanoResin dispersion is compared to MIEX® dispersion for high SUVA adsorption using similar resin dose in Table VI below. A 0.51 mg sample of NanoResin had a $\Delta A254$=0.136 and a % difference UV254 of 94%. A 2.5 mg sample of MIEX® had a $\Delta A254$=0.0108 giving a % difference UV254 from MIEX® of only 2.3% NOM removed.

TABLE VI

Raw data from 15 minute, high SUVA surrogate adsorption experiments

| Adsorbent Media | Mass of Adsorbent (mg) | UV254 initial | UV254 Removal (initial − final) | (UV removal)/ (g adsorbent) (A.U./g) | UV254 % difference | (UV254 % difference)/ (g adsorbent) |
|---|---|---|---|---|---|---|
| NanoResin Dispersion | 0.51 | 0.1452 | 0.1363 | 265 | 93.9 | 1.82E5 |
|  | 0.51 | 0.1452 | 0.1368 | 266 | 94.2 | 1.83E5 |
| MIEX | 2.55 | 0.4697 | 0.0109 | 4.27 | 2.32 | 910 |
|  | 2.49 | 0.4697 | 0.0107 | 4.30 | 2.28 | 915 |

The data in Tables IV to VI illustrates the intrinsic ability of the NanoResin structure and material to remove both low and high SUVA types of refractory NOM with little discrimination over size or aromatic character. The reduced capability of MIEX® to remove the high SUVA NOM is likely related to its undesirable pore structure. Larger molecules can sterically block others from binding to available sites. However, the open resin structure of the NanoResin enables easier access to the IEX sites along the large surface area of the SWCNT-poly(vbTMAC) microstructure.

Tables VII and VIII include data from five minute incubation studies. While the dispersed NanoResin still exhibits high capacity and rapid removal of the NOM, the NanoResin thin film is less effective at the shorter times. This is again believed to be related to the transport of NOM into the thin film material. As with MIEX® beads dispersed in water, the NOM must diffuse into the film to bind.

TABLE VII

Raw data for the low SUVA surrogate adsorption experiments.
All samples were allowed to incubate for five minutes

| Adsorbent Media | Mass of Adsorbent (mg) | UV254 initial | UV254 Removal (initial − final) | (UV removal)/ (g adsorbent) (A.U./g) | UV254 % difference | (UV254 % difference)/ (g adsorbent) |
|---|---|---|---|---|---|---|
| NanoResin Dispersion | 0.23 | 0.0817 | 0.0521 | 230 | 63.8 | 2.81E5 |
| NanoResin Film | 0.35 | 0.188 | 0.0500 | 142 | 26.6 | 7.57E4 |
| MIEX ® | 0.59 | 0.188 | 0.0140 | 23.7 | 7.45 | 1.26E4 |

TABLE VIII

Raw data for the low SUVA surrogate adsorption experiments.
All samples were allowed to incubate for five minutes

| Adsorbent Media | Mass of Adsorbent (mg) | Initial Surrogate Conc. (mg-C/L) | Final Surrogate Conc.; Ceq (mg-C/L) | TOC % difference | (% diff TOC)/ (g adsorbent) | qe (mg-C NOM)/ (g adsorbent) |
|---|---|---|---|---|---|---|
| NanoResin Film | 0.35 | 8.90 | 6.22 | 30.1 | 86000 | 53.4 |
| MIEX ® | 0.59 | 8.90 | 6.99 | 21.5 | 36400 | 22.6 |

The data further supports the idea that NanoResin effectively exposes its IEX sites to the solution, while the SWCNT scaffold maintains the material's morphology. Without the SWCNT scaffold, the polymer strands would form a resin bead and decrease the SSA. Moreover, the SWCNT scaffold allows the material to be more easily recovered and thereby, reused.

Adsorption of Myrtle Beach, S.C. NOM Concentrate: A concentrated NOM sample from Myrtle Beach, S.C. was diluted to a DOC of 11.52 mg-C/L, with a UV254 absorbance of 0.396, giving a SUVA of 4.36 $L·mg^{-1}·m^{-1}$. The adsorption capabilities of a NanoResin film were measured and the UV254 and TOC results are included in Tables IX and X below, respectively.

TABLE IX

Adsorption of Myrtle Beach, SC NOM concentrate onto NanoResin. Samples incubated for five minutes

| Adsorbent Media | Mass of Adsorbent (mg) | UV254 initial | UV254 Removal (initial − final) | (UV removal)/ (g adsorbent) (A.U./g) | UV254 % difference | (UV254 % difference)/ (g adsorbent) |
|---|---|---|---|---|---|---|
| NanoResin Film | 0.34 | 0.5026 | 0.1041 | 303 | 20.7 | 6.02E4 |

TABLE X

Adsorption of Myrtle Beach, SC NOM concentrate onto NanoResin. Samples incubated for five minutes

| Adsorbent Media | Mass of Adsorbent (mg) | Initial Surrogate Conc. (mg-C/L) | Final Surrogate Conc.; Ceq (mg-C/L) | TOC % difference | (% diff TOC)/ (g adsorbent) | qe (mg-C NOM)/ (g adsorbent) |
|---|---|---|---|---|---|---|
| NanoResin Film | 0.34 | 11.5 | 9.17 | 20.4 | 5.93E4 | 235 |

After a five minute incubation with a 0.34 mg NanoResin film, the UV254 fell from $A_{254}=0.5026$ to $A_{254}=0.1041$, a 20.7% reduction. The NanoResin also effectively reduced the TOC of the natural water sample. The surrogate concentration dropped from 11.5 mg-C/L to 9.17 mg-C/L after a five minute incubation, a 20.4% reduction. After incubation, the SUVA was measured to be 4.35 $L·mg^{-1}·m^{-1}$, with no effective change in SUVA from the initial sample. This indicates that the NanoResin shows little preference over hydrophilic and hydrophobic compounds; universally removing high MW and low MW NOM until all active sites have been exchanged. This behavior is consistent with the chosen polymerization mechanism and functionalization which leads to a nanoscale thin film that does not contain polymer branching and/or crosslinking between strands (i.e., 0% crosslinking and no polymer branching).

EXAMPLE 5

Regeneration and Reuse of NanoResin

Figure 19:
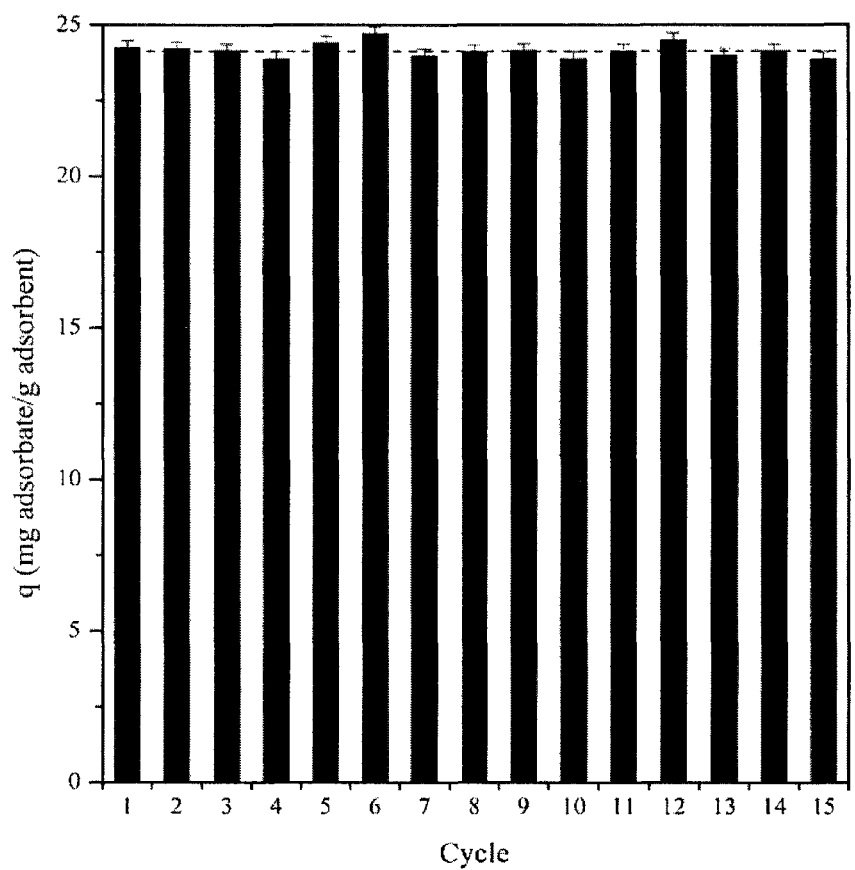
FIG. 19 is a graphical illustration of adsorbent data obtained via regenerating and reusing nanomaterials according to some embodiments described herein.

FIG. 19 illustrates NOM loading or adsorption as a function of regeneration cycle of the NanoResin. A brine solution (2.0 M NaCl) was used to desorb NOM from the NanoResin for 15 cycles, and adsorption was measured for each cycle. Excess brine was rinsed away with milli-Q water until conductivity measurements showed no residual NaCl, before adding the surrogate low MW NOM. After five minute incubation with the film, the specific adsorption qe was measured. The sample film was then regenerated with brine and the experiment repeated. It was found that through 15 adsorption/regeneration cycles at neutral pH, the NanoResin film maintained the same adsorption capacity without perceptible degradation within experimental uncertainty where qe versus cycle has a slope of (−0.057±0.06)%/cycle; as shown in FIG. 19. Thus, NanoResin materials herein are advantageous in that the materials can be regenerated and reused multiple times, proving to be a sustainable water purification and filtration material.

Using a surrogate (NaFL) DOC concentration of 2.28 mg-C/L, it was found that the film could effectively adsorb the surrogate, and just as efficiently desorb it in a brine solution. This demonstrates that the ionic polymer/functionalized CNT NanoResin materials described herein can be regenerated and reused for continued NOM removal. The DOWEX® resin beads fractured and degraded after regeneration in brine, and cannot be considered a sustainable water purification material.

Various embodiments of the present invention have been described in fulfillment of the various objectives of the invention. It should be recognized that these embodiments are merely illustrative of the principles of the present subject matter. Numerous modifications and adaptations thereof will be readily apparent to those skilled in the art without departing from the instant disclosure.

The invention claimed is:
1. A separation medium comprising:
a nanoparticle support comprising a plurality of individual nanoparticles mechanically supporting an oligomeric stationary phase; and
the oligomeric stationary phase forming individual films on the individual nanoparticles of the support, the individual films having thickness of 1 nm to 100 nm, the stationary phase comprising a plurality of oligomeric chains that include one or more charged moieties for anion exchange or cation exchange, wherein the oligomeric chains comprise 10-100 repeating monomer units, and wherein the oligomeric chains forming the individual films of the stationary phase are not cross-linked and/or branched.

2. The separation medium of claim 1, wherein the individual films have thickness of 2 nm to 20 nm.

3. The separation medium of claim 1, wherein the oligomeric chains of the individual films of the stationary phase are covalently bonded to the individual nanoparticles.

4. The separation medium of claim 3, wherein the oligomeric chains include one or more cationic moieties for anion exchange.

5. The separation medium of claim 4, wherein the cationic moieties comprise quaternary ammonium groups.

6. The separation medium of claim 3, wherein the oligomeric chains include one or more anionic moieties for cation exchange.

7. The separation medium of claim 3, wherein the nanoparticles are carbon nanoparticles.

8. The separation medium of claim 7, wherein the carbon nanoparticles are selected from the group consisting of single walled carbon nanotubes, multi-walled carbon nanotubes, carbon nanocones, fullerenes, graphene and combinations thereof.

9. The separation medium of claim 1, wherein the individual films of the oligomeric stationary phase are conformal to surfaces of the individual nanoparticles.

10. The separation medium of claim 1, wherein each of the repeating monomer units comprises an ionic moiety.

11. A water treatment device comprising:
a membrane; and
a separation medium coupled to the membrane, the separation medium comprising a nanoparticle support comprising a plurality of individual nanoparticles mechanically supporting an oligomeric stationary phase, and the oligomeric stationary phase forming individual films on individual nanoparticles of the support, the individual films having thickness of 1 nm to 100 nm, and the stationary phase comprising a plurality of oligomeric chains that include one or more charged moieties for anion exchange or cation exchange, wherein the oligomeric chains comprise 10-100 repeating monomer units.

12. The water treatment device of claim 11, wherein the membrane is fibrous.

13. The water treatment device of claim 11, wherein the separation medium is coupled to one or more interior surfaces of the membrane.

14. The water treatment device of claim 13, wherein the membrane is tubular.

15. The water treatment device of claim 11, wherein the oligomeric chains forming the individual films of the stationary phase are not cross-linked and/or branched.

16. The water treatment device of claim 11, wherein the individual films have thickness of 2 nm to 20 nm.

17. The water treatment device of claim 11, wherein the oligomeric chains of the individual films of the stationary phase are covalently bonded to the individual nanoparticles.

18. The water treatment device of claim 11, wherein each of the repeating monomer units comprises an ionic moiety.

19. A method of treating a water source comprising:
providing a water treatment device comprising a membrane and a separation medium coupled to the membrane, the separation medium comprising a nanoparticle support comprising a plurality of individual nanoparticles mechanically supporting an oligomeric stationary phase, and the oligomeric stationary phase forming individual films on the individual nanoparticles of the support, the individual films having thickness of 1 nm to 100 nm, and oligomeric chains of the stationary phase include one or more charged moieties for anion exchange or cation exchange, wherein the oligomeric chains comprise 10-100 repeating monomer units;
contacting the separation medium with the water source; and
removing one or more contaminant species from the water source with the separation medium.

20. The method of claim 19, wherein the individual films have thickness of 2 nm to 20 nm.

21. The method of claim 19, wherein the oligomeric chains forming the individual films of the stationary phase are not cross-linked and/or branched.

22. The method of claim 19, wherein the oligomeric chains of the individual films of the stationary phase are covalently bonded to the individual nanoparticles.

23. The method of claim 22, wherein the nanoparticles are carbon nanoparticles.

24. The method of claim 19, wherein the separation medium establishes ion-exchange equilibrium with the water source in less than 10 minutes.

25. The method of claim 19, wherein contaminant interaction with the moieties is limited solely by solvent diffusion.

26. The method of claim 25, wherein the one or more contaminants are natural organic matter.

27. The method of claim 26, wherein the separation medium removes greater than 90 percent of natural organic matter from the water source.

28. The method of claim 26, wherein the separation medium removes greater than 95 percent of natural organic matter from the water source.

29. The method of claim 19, wherein the one or more contaminants comprise humic acid, fulvic acid, trihalomethane, haloacetic acid, a carboxylate group or a phenolate group.

30. The method of claim 19, wherein the contaminants comprise one or more transition metals.

31. The method of claim 19 further comprising regenerating the separation media.

32. The method of claim 19, wherein each of the repeating monomer units comprises an ionic moiety.

* * * * *